(12) United States Patent
Ebert

(10) Patent No.: US 7,268,782 B2
(45) Date of Patent: Sep. 11, 2007

(54) SMART RADAR CHART

(75) Inventor: Peter S. Ebert, Menlo Park, CA (US)

(73) Assignee: Sap Aktiengesellschaft, Walldorf (DE)

( * ) Notice: Subject to any disclaimer, the term of this patent is extended or adjusted under 35 U.S.C. 154(b) by 68 days.

(21) Appl. No.: 10/697,253

(22) Filed: Oct. 31, 2003

(65) Prior Publication Data

US 2005/0093866 A1     May 5, 2005

(51) Int. Cl.
*G06T 11/20* (2006.01)
(52) U.S. Cl. ................................... 345/440
(58) Field of Classification Search ........... 345/440, 345/440.1–443
See application file for complete search history.

(56) References Cited

U.S. PATENT DOCUMENTS

| | | | | |
|---|---|---|---|---|
| 5,960,381 A * | 9/1999 | Singers et al. | ............... | 702/183 |
| 6,011,537 A * | 1/2000 | Slotznick | ............... | 715/733 |
| 6,211,887 B1 * | 4/2001 | Meier et al. | ............... | 345/440 |
| 6,509,898 B2 * | 1/2003 | Chi et al. | ............... | 345/440 |
| 6,721,734 B1 * | 4/2004 | Subasic et al. | ............... | 707/5 |
| 6,775,634 B2 * | 8/2004 | Bachmann | ............... | 702/107 |
| 6,923,653 B2 * | 8/2005 | Ito | ............... | 434/236 |
| 2002/0101418 A1 * | 8/2002 | Vernier et al. | ............... | 345/418 |
| 2004/0070624 A1 * | 4/2004 | Fushimi et al. | ............... | 345/771 |
| 2004/0113912 A1 * | 6/2004 | Brooks et al. | ............... | 345/440 |

FOREIGN PATENT DOCUMENTS

JP          2002245201 A  *  8/2002

* cited by examiner

*Primary Examiner*—Ryan Yang
(74) *Attorney, Agent, or Firm*—Fish & Richardson P.C.

(57) ABSTRACT

Data corresponding to one or more data dimensions is obtained from a data source. A smart radar chart graphical user interface is generated. The smart radar chart graphical user interface includes a visual representation of the obtained data corresponding to the one or more data dimensions. Each data dimension is displayed radiating from a central point, and data corresponding to a data dimension is displayed at a position indicating the value of the data in relation to a reference value so as to enable the identification of an exception.

32 Claims, 22 Drawing Sheets

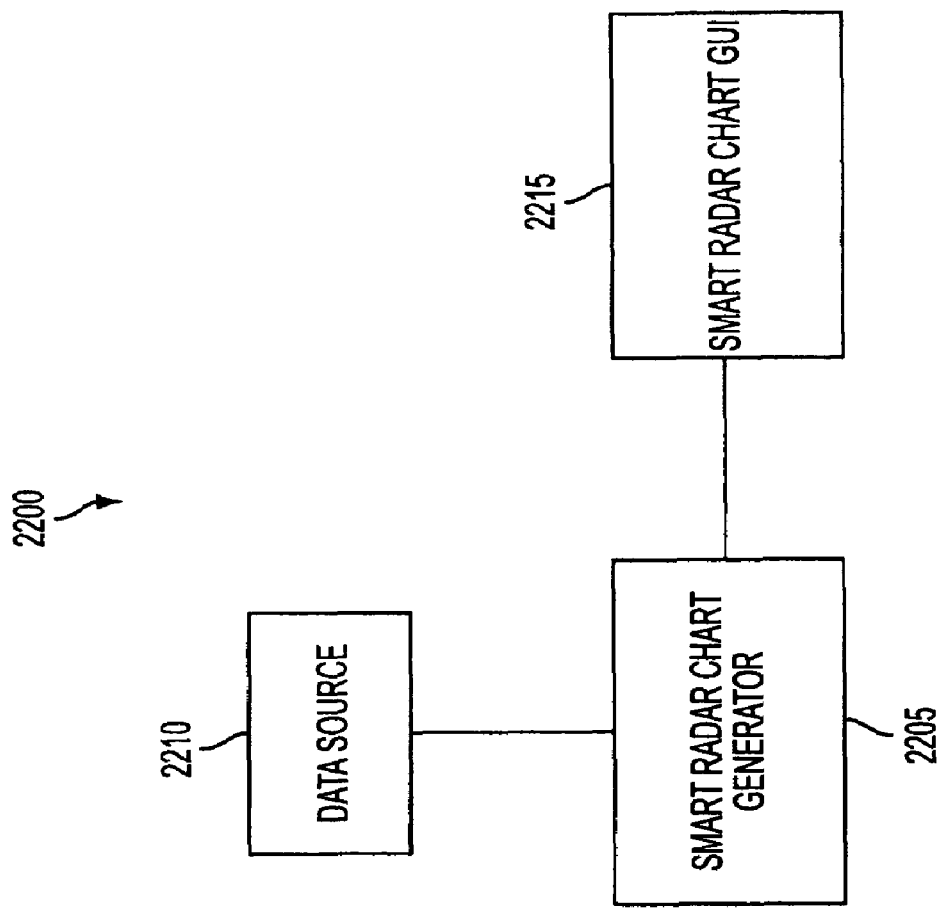

SMART RADAR CHART

TECHNICAL FIELD

This disclosure relates to a smart radar chart for the visualization of multidimensional data.

BACKGROUND

Success in the enterprise market place typically depends on fast, well-informed reactions to real-time information coming from internal and external sources. There is an increasing demand for real-time reporting and monitoring solutions of volatile key performance indicators (KPI). For example, in the domain of supply chain management, lags between events and reactions typically translate into higher costs. In the domain of physical security solutions, any lag between event and reaction can be catastrophic.

KPIs may be presented to users in a variety of formats. KPIs may be dynamic, and may be updated at different intervals. As new data is received, the minimum, maximum and average values, among other properties, may be affected by the new data, and the relation of the current value of the KPI to a reference value may be difficult to display in a uniform fashion. This is especially true as additional KPIs are added, and the display of multiple data dimensions may become unmanageable. The units and reference values typically differ between KPIs, and the screen real estate required to display the KPIs typically increases as the number of KPIs increases. In particular, it may become difficult for a user to be alerted to the existence of positive and negative exceptions in the KPIs. Once identified, it may also be difficult for a user to investigate a particular exception in more detail and take appropriate action based upon the investigation.

SUMMARY

Implementations described below provide techniques for visualizing a multiple key performance indicators (KPIs) contemporaneously while keeping the user's mental workload at a minimum. In addition, since the user's tasks will typically not be limited to monitoring a specific set of key performance indicators, techniques are provided to enable the specific visualizations to consume a small amount of display real estate while continuing to enable monitoring of the KPIs by the user. Applications include monitoring of KPIs in enterprise applications, industrial processes and controls, and governmental and civic functions.

A smart radar chart includes a graphical user interface (GUI) facilitating near real-time, interactive visualization of multi-dimensional data. In a smart radar chart GUI, multiple dimensions of data are displayed radiating from a central point. A circle around the central point identifies the average value for each dimension and colors, shading and/or other appropriate visual indications are used to indicate whether a particular value is greater than or less than the average for that dimension.

According to one general aspect, data corresponding to one or more data dimensions is obtained from a data source. A smart radar chart graphical user interface is generated. The smart radar chart graphical user interface includes a visual representation of the obtained data corresponding to the one or more data dimensions. Each data dimension is displayed radiating from a central point, and data corresponding to a data dimension is displayed at a position indicating the value of the data in relation to a reference value so as to enable the identification of an exception. The smart radar chart graphical user interface is rendered.

Implementations may include one or more of the following features. For example, the smart radar chart graphical user interface may include a first level of detail of the obtained data. A second smart radar chart graphical user interface may be generated. The second smart radar chart graphical user interface includes a second level of detail of the obtained data for one or more dimensions displayed in the first smart radar chart graphical user interface.

The data may be obtained from a remote data source and may be obtained using, for example, a communications link, and, for example, using HTTP. In another implementation, data is obtained from a local data source. The data may be obtained periodically, continuously, or in response to an occurrence of an event such as a user input. In one implementation, only data that is new, updated or otherwise changed is obtained.

The reference value may be the average value, minimum value, or maximum value of measured data corresponding to a data dimension. The reference value may be dynamically computed, and may be stored. In another implementation, the reference value may be a predetermined value.

The data may be normalized, and may be displaying in relation to a representation of the reference value. The representation of the reference value may be a circle, and the circle may have a radius corresponding to the reference value. The data may be displayed at a distance proportional to the magnitude of the deviation of the data from the reference value. Normalizing the data may include normalizing the data based at least in part upon a minimum value and a maximum value. The minimum value and the maximum value may be dynamically computed based on the obtained data.

Generating the smart radar chart may include visually indicating a difference between the data and the reference value by, for example, providing a coloring or a shading. A summary indicator may be rendered based on the value of the data. An audible alert may be generated to indicate the presence of an exception.

In another general aspect, an apparatus includes a data source configured to provide data to a smart radar chart generator. The smart radar chart generator is configured to obtain data corresponding to one or more data dimensions from a data source, generate a smart radar chart graphical user interface, and enable rendering of the smart radar chart graphical user interface. The smart radar chart graphical user interface includes a visual representation of the obtained data corresponding to the one or more data dimensions. Each data dimension is displayed radiating from a central point, and data corresponding to a data dimension is displayed at a position indicating the value of the data in relation to a reference value so as to enable identification of an exception.

Implementations may include one or more of the following features. For example, the smart radar chart generator may generate a first smart radar chart graphical user interface having a first level of detail of the obtained data. The smart radar chart generator may be further configured to generate a second smart radar chart graphical user interface having a second level of detail of the obtained data for one or more of the dimensions displayed in the first smart radar chart graphical user interface. The smart radar chart generator may be configured to obtain data from a remote data source.

Generating the smart radar chart may include normalizing the data and displaying the data in relation to a representation of the reference value. The reference value may include an average value of measured data corresponding to a data dimension. The data may be displayed at a distance proportional to the magnitude of the deviation of the data from the reference value. The difference between the data and the reference value may be visually indicated, for example by a coloring or a shading.

In yet another general aspect, a graphical user interface enables perception of information regarding one or more data dimensions. The interface includes a data presentation area and a visual representation within the data presentation area based upon data corresponding to one or more data dimensions. Each data dimension is displayed radiating from a central point in a common plane, and data corresponding to a data dimension is displayed at a position indicating the value of the data in relation to a reference value so as to enable identification of an exception.

The visual representation may include a first representation with a first level of detail of the data. The interface may also include a second representation with a second level of detail of the data for one or more dimensions displayed in the first representation. The second representation may be activated in response to user selection of a designated portion of the first representation. The user selection may be inferred, for example, based upon the position of an input device relative to a user interface, inferred based upon maintaining the input device in a position relative to the user interface for a predetermined threshold period of time. The user selection also may be an overt selection activity using a user input device. The second representation may be rendered, for example, in a pop-up window or as an overlay to the first representation. The second representation may be automatically closed. For example, the second representation may be automatically closed based upon an expiration of a predetermined length of time or based upon an inferred intent to close the second representation. The intent to close the second representation may be inferred, for example, based upon a position of a user input device, a movement of a user input device, or based upon a position of a user input device and an expiration of a predetermined length of time.

The reference value may include an average value, a minimum value, or a maximum value of measured data corresponding to a data dimension. The reference value also may include a predetermined value. The data may be displayed in relation to a representation of the reference value. For example, the representation of the reference value may be a circle having a radius corresponding in length to the reference value. The data may be displayed at distance proportional to the magnitude of the deviation of the data from the reference value. The interface may also visually indicate the difference between the data and the reference value, for example, by using a coloring or a shading. The interface may include a summary indicator based on the value of the data. Also, an audible alert may be generated to indicate the presence of an exception.

The details of one or more implementations are set forth in the accompanying drawings and the description below. Other features will be apparent from the description and drawings, and from the claims.

DESCRIPTION OF DRAWINGS

FIG. 22 is a block diagram of an exemplary system for generating a smart radar chart GUI.

DETAILED DESCRIPTION

A smart radar chart includes a graphical user interface (GUI) facilitating near real-time, interactive visualization of multi-dimensional data. Data relating to certain key performance indicators (KPIs) is obtained and displayed in a smart radar chart GUI for monitoring by a user. Multiple KPIs may be displayed contemporaneously, and each separate KPI may be designated as a data dimension. Typically, the various dimensions of data are displayed radiating from a central point in a common plane. Techniques are provided to enable the user to perceive exceptions (i.e., positive and negative deviations from a normal, desired or expected parameter) in the data very quickly and easily, even with a large number of visualized dimensions and/or with a small display area available for the visualization. For example, a circle around the central point identifies the average value for each dimension and appropriate visual indications are used to indicate whether a particular value is greater than or less than the average for that dimension.

Figure 1:
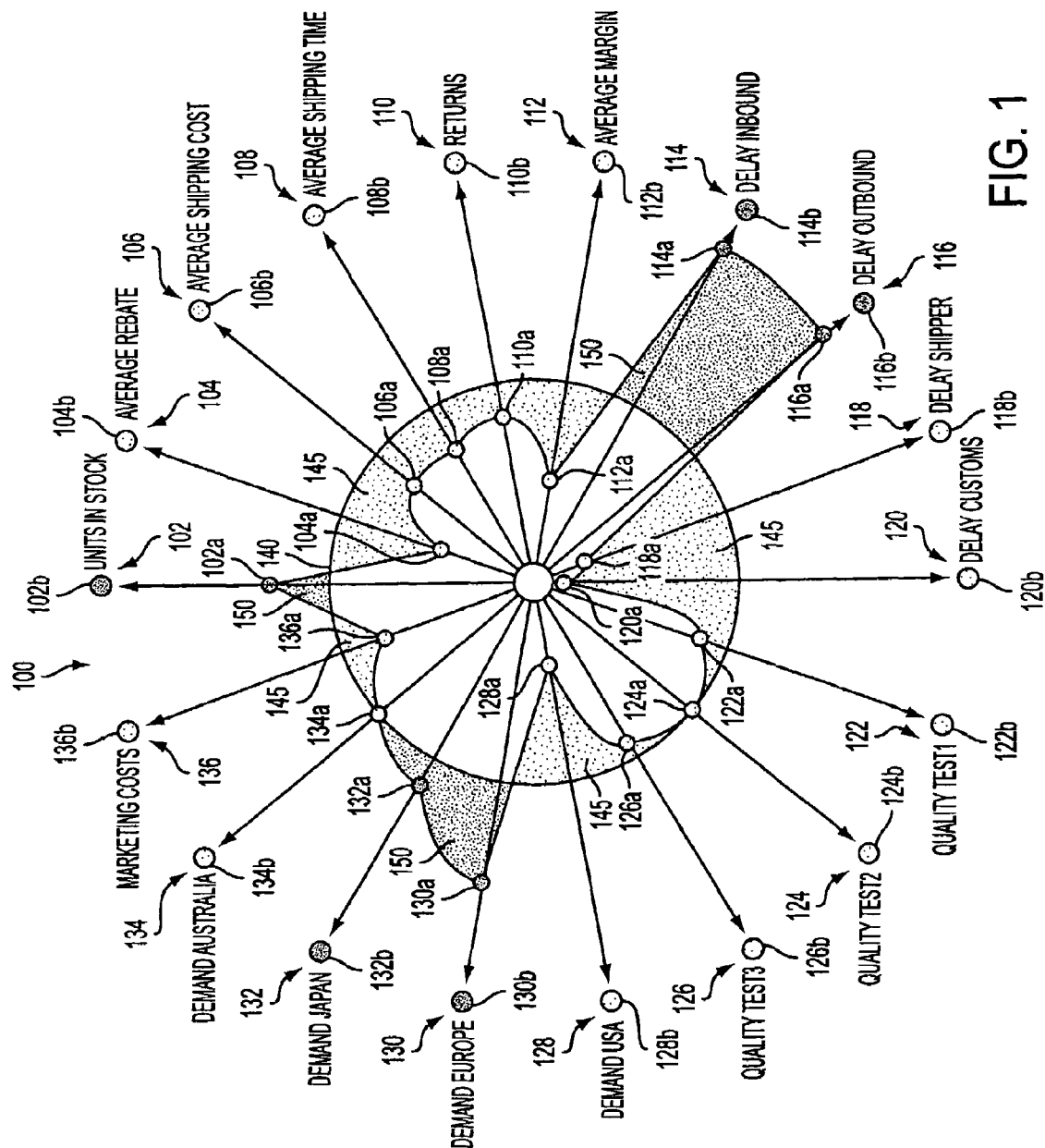
FIG. 1 is a screen shot illustrating an implementation of a visualization in a smart radar chart GUI.

FIG. 1 depicts an example of a visualization 100, using a smart radar chart GUI, for contemporaneously visualizing eighteen different data dimensions 102, 104, 106, 108, 110, 112, 114, 116, 118, 120, 122, 124, 126, 128, 130, 132, 134, and 136. The visualization 100 enables a user to perceive exceptions in the data very quickly and easily, even with a large number of visualized dimensions present and/or with a small display area available for the visualization. A data point is plotted/displayed along the data dimensions to which it corresponds. The plotted data is normalized to a 50% circle 140, so that data points having the normal value will be plotted on the normal circle 140. The normal value may be, for example, the average value, expected value, or a desired value for the data. Data having a greater than normal value (positive exception) will be plotted on one side of the normal circle 140 and data having a less than normal value (negative exception) will be plotted on the other side of the normal circle 140. Color coding, shading, or other techniques may be used to further distinguish the positive and negative exceptions and to enhance the visibility of the exceptions.

In one implementation, data having a value greater than normal is plotted inside the normal circle 140 and a first shaded area 145 is rendered about the plotted data point to highlight the positive exception. As an example, the first shaded area 145 may be shaded green. However, other colors and/or textures may be used. Data having a value greater than or equal to the designated maximum value is plotted at or near the center of the visualization 100. Also, data having a value less than normal is plotted outside the normal circle 140 and a second shaded area 150 is rendered about the plotted data point to highlight the negative exception. As an example, the second shaded area 150 may be shaded red to further distinguish the negative exception from the positive exception. Other colors and/or textures may be used. In another implementation, the negative and positive exceptions may have the same appearance. Data having a value less than or equal to the designated minimum value is plotted at or near the furthest extent from the center of the visualization 100.

In another implementation, data having a value less than normal is plotted inside the normal circle 140 and a first shaded area 145 is rendered about the plotted data point to highlight the negative exception. Data having a value less than or equal to the designated minimum value is plotted at or near the center of the visualization 100. Also, data having a value greater than normal is plotted outside the normal circle 140 and a second shaded area 150 is rendered about the plotted data point to highlight the positive exception. Data having a value greater than or equal to the designated maximum value is plotted at or near the furthest extent from the center of the visualization 100. Other implementations are possible, for example various colors and/or textures may be applied to the positive and/or negative exceptions, or the color and/or texture may be the same for both positive and negative exceptions.

A user will be able to easily get a feeling for how significant the exception is, depending on the direction and distance of the visualized data point from the 50% circle 140. By connecting and coloring/shading the data points as shown in FIG. 1, the significance of positive and negative exceptions is optically amplified to enable fast and easy identification of the exception, and to enable further investigation by the user. For example, the user may zoom in on a particular investigation to obtain more detail concerning the exception.

The data dimensions being plotted typically are evenly dispersed among the 360 degrees of the circular radar chart visualization 100. If the number of dimensions remains unchanged, a data dimension will be plotted at a consistent angle, even as the value of the data being plotted for that data dimension changes. Thus, a user will be able to remember the angle at which a specific data dimension is displayed, which allows a user to easily refer back to that data.

In another implementation, the angle of the data may remain unchanged even as other dimensions are added or subtracted, and thus the dimensions may not be evenly distributed in such an implementation.

In one implementation, data corresponding to one or more of the plotted data dimensions may be periodically requested from a data source and the visualization 100 may be adjusted in response to the data received from the data source. For example, data may be requested from the data source over the Internet via hypertext transfer protocol (HTTP), and the visualization may be refreshed using the data received from the data source. In another implementation, data may be continuously requested or supplied. For example, a data bus may be monitored in order to listen for, and react to, any events (i.e., data) related to the corresponding visualization. In other implementations, the data may be requested upon an event such as a manual request by a user through manipulation of a user interface (UI) control. Software rendering the visualization may be integrated with other software applications.

The software rendering the visualization may feature an extensible markup language (XML) application program interface (API), as discussed below, or other suitable APIs. As discussed, the different data dimensions are normalized to provide a consistent "picture" to the user. Data dimensions typically are by a caption (caption) for the data, a minimum value (minVal) for the data, an average value (averageVal) for the data, a maximum value (maxVal) for the data, and a current value (value) of the data.

As discussed previously, the circle 140 at 50% of the length of each dimension represents the average value for each dimension, the areas 145 shaded with a first shading such as, for example, the color green, may represent that the current value is better than averageVal, and the areas 150 shaded with a second shading such as, for example, the color red, may represent that current value is worse than averageVal. As shown, worse than average values are shown in the outer area of the 50% circle and better than average values are shown in the inner area of the 50% circle. If the current value is equal to the minValue, the current value may be shown at the innermost point of a dimension. Also, if the value is equal to the maxValue, the value may be shown at the outermost point of a dimension.

The following structure depicts an example of an XML-based approach that illustrates one possible implementation in which data may be communicated to the visualization software. The top-level element "SmartRadarChart" contains a number of "dimension" elements holding the specific data for each dimension:

```
<SmartRadarChart attribX="..."...>
    <dimension attribX="..."...>
    <dimension attribX="..."...>
    <dimension attribX="..."...>
    ...
</SmartRadarChart>
```

The XML structure shown in Table 1 depicts an example of a detailed XML input described above. FIG. 1 illustrates a smart radar chart visualization 100 rendered using the data in Table 1.

TABLE 1

```xml
<?xml version="1.0"?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="397" unit="" unitPos="right"
minValue="200" averageValue="300" maxValue="600" valueWeight="1200"/>
    <dimension caption="Average rebate " value="9.12" unit="$" unitPos="left"
minValue="0" averageValue="21.35" maxValue="35" valueWeight="1200"/>
    <dimension caption="Average shipping cost" value="5.75" unit="$" unitPos="left"
minValue="3" averageValue="6.75" maxValue="12.00" valueWeight="1200"/>
    <dimension caption="Average shipping time" value="4.2" unit="days"
unitPos="right" minValue="2" averageValue="5" maxValue="10" valueWeight="1200"/>
    <dimension caption="Returns" value="400" unit="" unitPos="left" minValue="0"
averageValue="500" maxValue="400" valueWeight="1200"/>
    <dimension caption="Average Margin" value="6.12" moreIsBetter="true" unit="$"
unitPos="left" minValue="-5" averageValue="2.21" maxValue="7.34"
valueWeight="1200"/>
    <dimension caption="Delay Inbound" value="600" unit="" unitPos="right"
minValue="200" averageValue="300" maxValue="600" valueWeight="1200" />
    <dimension caption="Delay Outbound" value="34.12" unit="$" unitPos="left"
minValue="0" averageValue="21.35" maxValue="35" valueWeight="1200" />
    <dimension caption="Delay Shipper" value="3.75" unit="$" unitPos="left"
minValue="3" averageValue="6.75" maxValue="12.00" valueWeight="1200" />
    <dimension caption="Delay Customs" value="2.2" unit=" days" unitPos="right"
minValue="2" averageValue="5" maxValue="10" valueWeight="1200" />
    <dimension caption="Quality Test1" value="78" moreIsBetter="true" unit="%"
unitPos="right" minValue="0" averageValue="67" maxValue="100" value Weight="1200"
/>
    <dimension caption="Quality Test2" value="88" moreIsBetter="true" unit="%"
unitPos="right" minValue="0" averageValue="87" maxValue="100" valueWeight="1200"
/>
    <dimension caption="Quality Test3" value="100" moreIsBetter="true" unit="%"
unitPos="right" minValue="0" averageValue="92" maxValue="100" valueWeight="1200"
/>
    <dimension caption="Demand USA" value="35" moreIsBetter="true" unit="k"
unitPos="right" minValue="0" averageValue="21.35" maxValue="35" valueWeight="1200"
/>
    <dimension caption="Demand Europe" value="3.75" moreIsBetter="true" unit="k"
unitPos="right" minValue="3" averageValue="6.75" maxValue="12.00"
valueWeight="1200"/>
    <dimension caption="Demand Japan" value="4.2" moreIsBetter="true" unit="k"
unitPos="right" minValue="2" averageValue="5" maxValue="10" valueWeight="1200" />
    <dimension caption="Demand Australia" value="300" moreIsBetter="true" unit=""
unitPos="right" minValue="0" averageValue="300" maxValue="400" valueWeight="1200"
/>
    <dimension caption="Marketing costs" value="650" unit=" k$ " unitPos="left"
minValue="320" averageValue="750" maxValue=" 1500" valueWeight="1200" />
</SmartRadarChart>
```

Referring to Table 1, one or more of the possible attributes of the element "SmartRadarChart" will be discussed. One or more of these attributes may be included. The attribute "sURL" corresponds to the URL of the data source. The attribute "sClickZoom" corresponds to an additional zoom setting to fine-tune the automatically magnifying zoom setting when the mouse is pressed at a specific location in the visualization 100, as discussed in more detail below. The attribute "sAlertSound," if set to true, indicates that an alert sound will being triggered when a visualized dimension shows a negative exception. The attribute "sRefreshPeriod" indicates the time, in milliseconds (ms), between periodic requests for data from sURL. The attribute "sCurvedView," if set to true, connects the plotted data points using curved lines, otherwise, if set to false, connects the plotted data points with straightly lines. The attribute "sAreaAlpha", typically set between the range of 0-100, sets the percentage of transparency of the first shaded areas 145 and second shaded areas 150 in the visualization 100.

Multiple data dimension elements may be included in the smart radar chart visualization 100. Each "dimension" element may include one or more of the following attributes.

The "caption" attribute indicates the caption of the particular dimension. The "value" attribute corresponds to the actual numeric value of a plotted data point in the visualized dimension. The "unit" attribute corresponds to the appropriate unit for the data dimension (e.g. "$"). The "unitPos" attribute corresponds to the position of the unit string in relation to the value caption (e.g. "left" or "right"). The "minValue" attribute corresponds to the minimum value in the relevant visualized dimension. For example, if the dimension "Average Rebate" is based on 1000 data measurement points, the smallest measured data point is defined as minValue. In another example, minValue may be a fixed value, and the actual value of the data point may be less than minValue. The "averageValue" attribute corresponds to the average value of the values in the relevant visualized dimension. For example, if the dimension "Average Rebate" is based on 1000 data measurement points, the average of the measured data points is defined as averageValue. The "maxValue" attribute corresponds to the maximum value of the values in the relevant visualized dimension. For example, if the dimension "Average Rebate" is based on 1000 data measurement points, the maximum measured data point is defined as maxValue. In another example, maxValue may be a fixed value, and the actual value of the data point may exceed maxValue. The "moreIsBetter" attribute, if set to true, indicates that a value higher than averageValue is defined to be visualized as a positive exception. If set to false or undefined, a value higher than averageValue is defined to be visualized as a negative exception. Thus, by changing the moreIsBetter attribute, an exception initially viewed as a positive exception may subsequently be visualized as a negative exception.

Referring again to FIG. 1, eighteen dimensions of data are shown in a first level of detail. The eighteen dimensions of data shown correspond to the values shown in part in Table 1. In particular, FIG. 1 shows a visualization 100 of eighteen dimensions of data 102, 104, 106, 108, 110, 112, 114, 116, 118, 120, 122, 124, 126, 128, 130, 132, 134, and 136. Each of the dimensions of data shown includes a data point 102a, 104a, 106a, 108a, 110a, 112a, 114a, 116a, 118a, 120a, 122a, 124a, 126a, 128a, 130a, 132a, 134a, and 136a. Each data point is plotted in a normalized fashion and illustrates the present value of the quantity being measured along each dimension. Each dimension also has a summary indicator 102b, 104b, 106b, 108b, 110b, 112b, 114b, 116b, 118b, 120b, 122b, 124b, 126b, 128b, 130b, 132b, 134b, and 136b. Each summary indicator usually indicates, e.g., by changing color, whether the value of the corresponding data point is greater than the average value, less than the average value, or equal to the average value. For example, in dimension 102, the data point 102a has a value that is considered to be worse than the average value, as indicated by the second shaded area 150 outside the 50% circle 140. The summary indicator 102b also indicates a shading such as a red coloring. Thus, at a glance, a user may see that the dimension 102 (labeled "units in stock") has, for example, a red colored summary indicator 102b and, without knowing the exact value, will know that that value of the units in stocks is worse than average. Additionally, as described below, it is possible to view a second, increased level of detail for each of the dimensions in the visualization 100 so that, for example, a user may determine the exact number of units in stock. One implementation for obtaining the second, increased level of detail is to "zoom in" on an area of interest (zoom view) using a mouse or other user input device.

Figure 2:
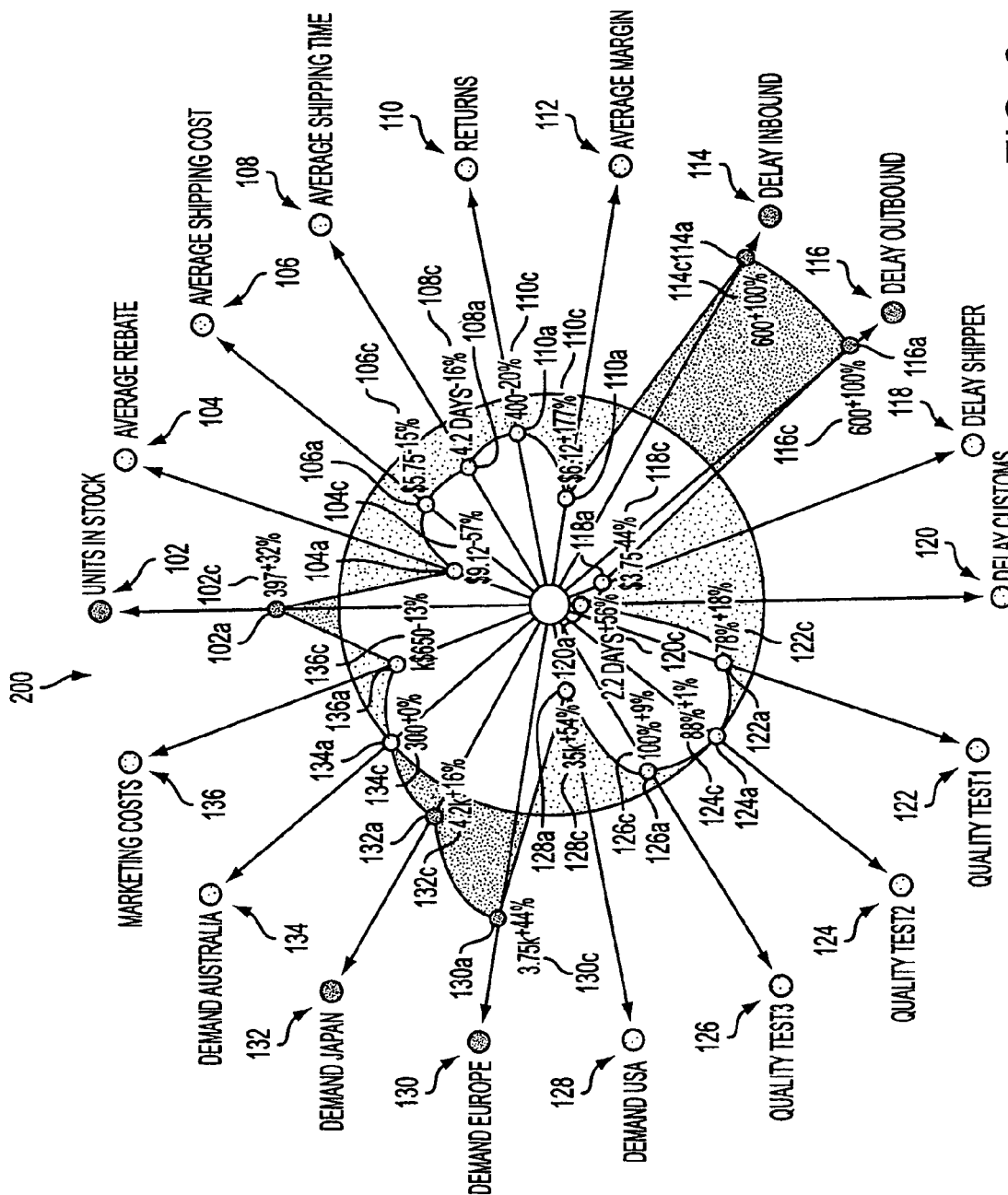
FIG. 2 is a screen shot illustrating an enlarged and expanded view of a portion of the visualization of FIG. 1.

FIG. 2 is an illustration of an enlarged and expanded view 200 of the visualization 100 of FIG. 1. As shown, the expanded view 200 reveals detailed captions and data for the data point of the displayed dimensions 102, 104, 106, 108, 110, 112, 114, 116, 118, 120, 122, 124, 126, 128, 130, 132, 134, and 136. In particular, the expanded view 200 shows a second, increased level of detail as an expanded data display 102c, 104c, 106c, 108c, 110c, 112c, 114c, 116c, 118c, 120c, 122c, 124c, 126c, 128c, 130c, 132c, 134c, and 136c for the data points 102a, 104a, 106a, 108a, 110a, 112a, 114a, 116a, 118a, 120a, 122a, 124a, 126a, 128a, 130a, 132a, 134a, and 136a of the dimensions 102, 104, 106, 108, 110, 112, 114, 116, 118, 120, 122, 124, 126, 128, 130, 132, 134, and 136. For example, expanded data display 102c shows an increased level of detail with respect to the value of data point 102a along dimension 102.

Similarly, expanded data display 104c is a detailed view of the data for data point 104a, expanded data display 106c is a detailed view of the data for data point 106a, expanded data display 108c is a detailed view of the data for data point 108a, expanded data display 110c is a detailed view of the data for data point 110a, expanded data display 112c is a detailed view of the data for 112a, expanded data display 114c is a detailed view of the data for data point 114a, expanded data display 116c is a detailed view of the data for data point 116a, expanded data display 118c is a detailed view of the data for data point 118a, expanded data display 120c is a detailed view of the data for data point 120a, expanded data display 122c is a detailed view of the data for data point 122a, expanded data display 124c is a detailed view of the data for data point 124a, expanded data display 126c is a detailed view of the data for data point 126a, expanded data display 128c is a detailed view of the data for data point 128a, expanded data display 130c is a detailed view of the data for data point 130a, expanded data display 132c is a detailed view of the data for data point 132a, expanded data display 134c is a detailed view of the data for data point 134a, and expanded data display 136c is a detailed view of the data for data point 136a.

In other implementations, an expanded view of less than all dimensions may be rendered. The expanded view 200 may be activated in response to user selection of a designated portion of the visualization 100. The user selection may be inferred, for example, based upon the position of an input device relative to a user interface, inferred based upon maintaining the input device in a position relative to the user interface for a predetermined threshold period of time. For example, the expanded view 200 may be invoked by the user by rolling over the visualization 100 with a mouse or other user input device. The user selection also may be an overt selection activity using a user input device. The expanded view 200 may be rendered, for example, in a pop-up window or as an overlay to the visualization 100. The expanded view 200 may be automatically closed. For example, the expanded view 200 may be automatically closed based upon an expiration of a predetermined length of time or based upon an inferred intent to close the expanded view 200. The intent to close the expanded view 200 may be inferred, for example, based upon a position of a user input device, a movement of a user input device, or based upon a position of a user input device and an expiration of a predetermined length of time.

Figure 3:
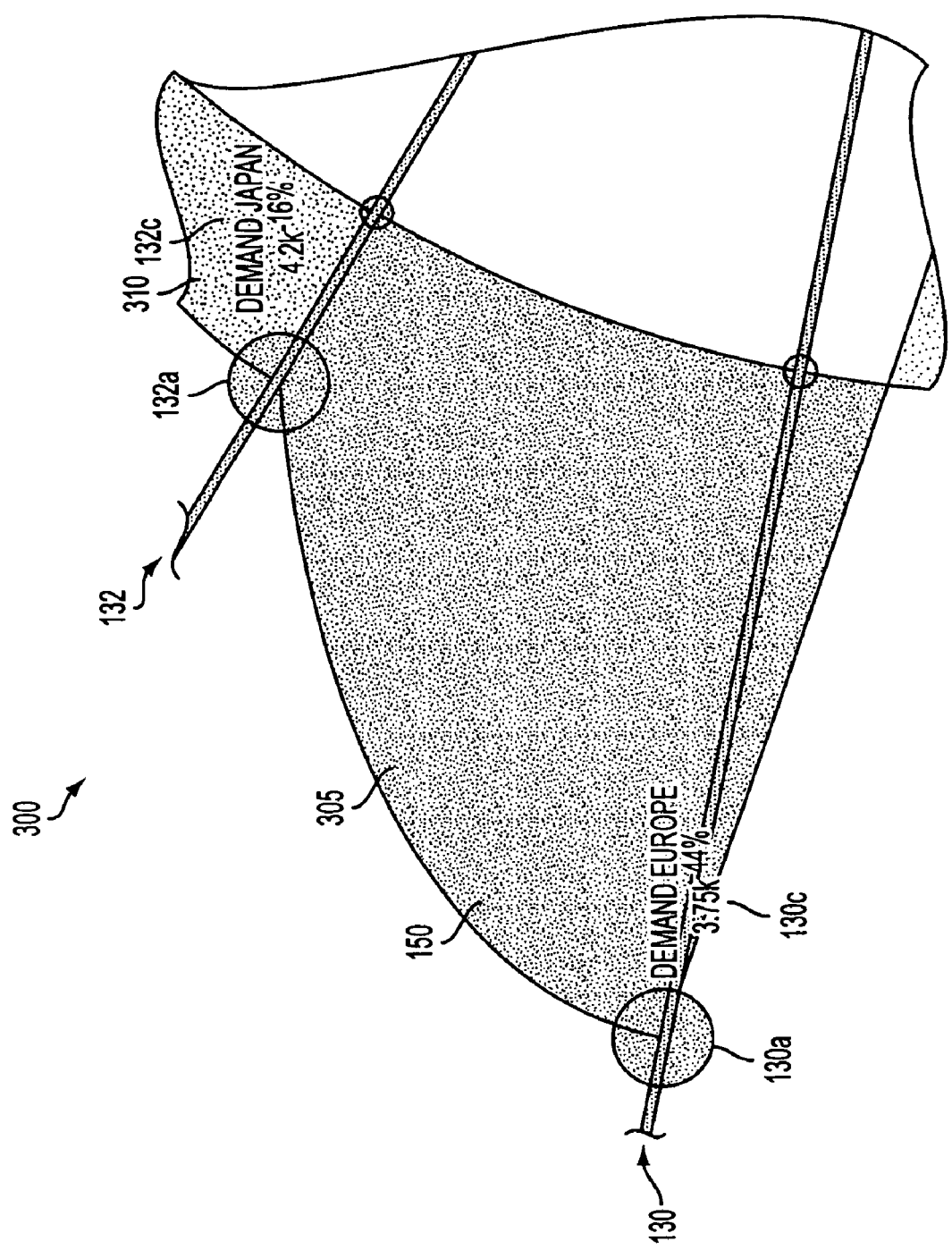
FIG. 3 is a screen shot illustrating an enlarged and expanded view of a portion of the visualization of FIG. 1.

FIG. 3 illustrates another implementation of an enlarged and expanded view 300 revealing a second, increased level of detail for a portion of the visualization 100. In particular, dimensions 130 and 132 are shown in an expanded view. Expanded data display 130c reveals an expanded view of the data for data point 130a, and expanded data display 132c reveals an expanded view of the data for data point 132a. FIG. 3 also provides an expanded view of negative exception areas 305 and 310, colored, for example, red and indicating that a worse than average value is present for the indicated data dimension. By going to the expanded view 300 from the visualization 100, a user may view exactly what values are generating the exception.

The expanded view 300 may be invoked, for example, by the user clicking and holding the mouse button or by manipulating other input controls. While holding the mouse button, the user is able to move the expanded view visualization in any direction, analogous to a magnifying glass view, in order to arrive at the desired view.

Figure 4:
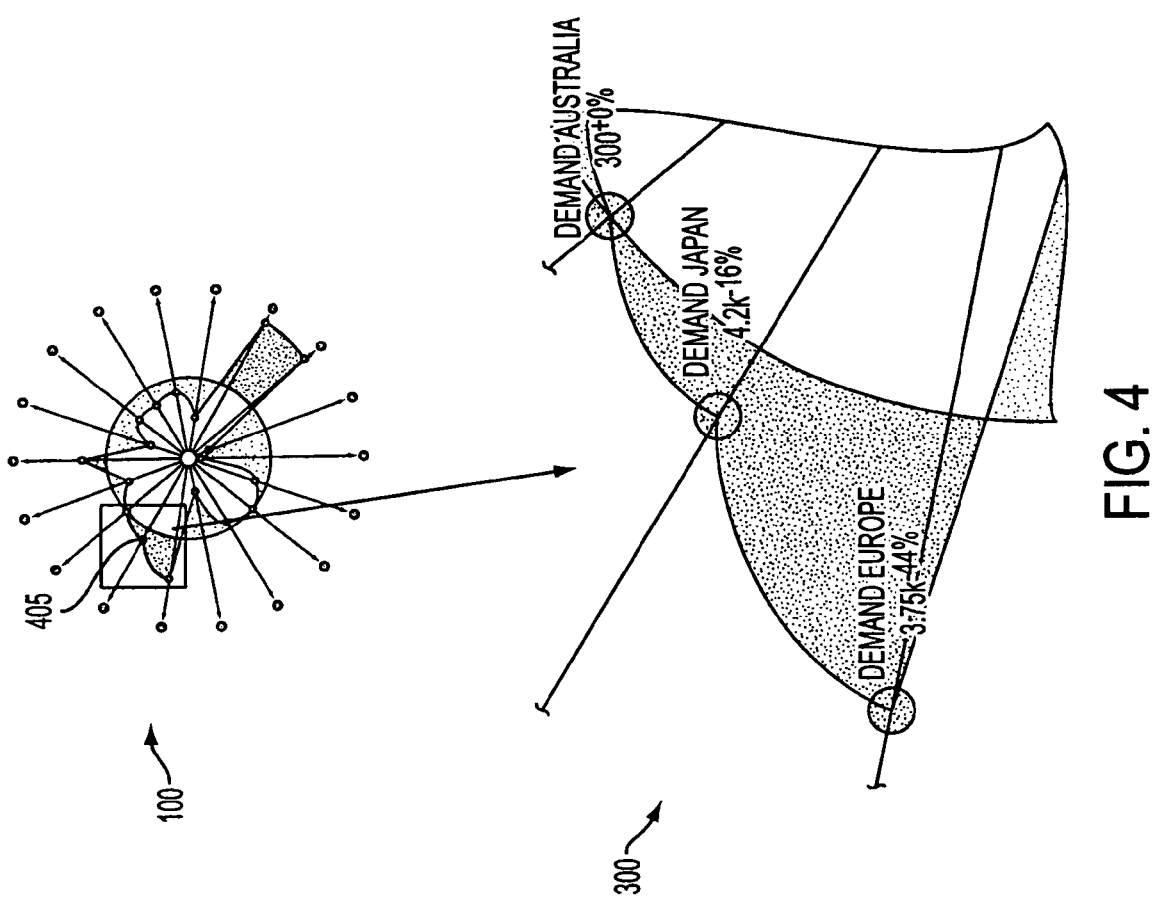
FIG. 4 is a screen shot illustrating a relationship of FIG. 1 to FIG. 3.

FIG. 4 illustrates the transition from the first level of detail of the visualization 100 shown in FIG. 1 to the expanded view of the visualization 300 revealing a second level of detail, as shown in FIG. 3. In particular, a user may manipulate a mouse or other input device while viewing visualization 100 to render the expanded view of the visualization 300 shown in FIG. 3. For example, the user may click a mouse at a point within area 405 on visualization 100 to render the expanded view of the visualization 300.

Figure 5:
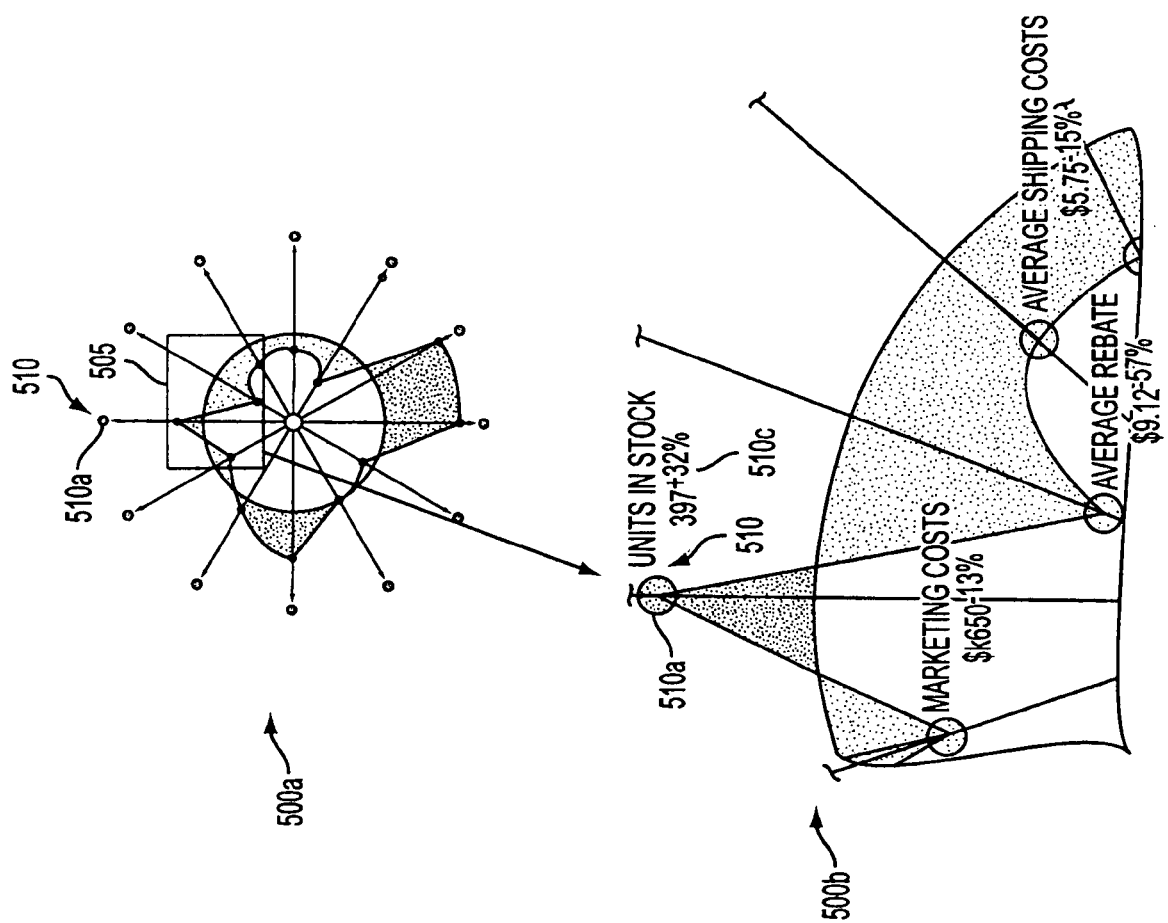
FIG. 5 is a screen shot illustrating another visualization and zoom feature in a smart radar chart GUI.

FIG. 5 shows another overview of the process of zooming in on a selected area of a visualization 500a having a first level of detail in order to see a portion of the visualization 500b in an expanded level of detail. In particular, a user may manipulate a mouse at a point within area 505 on visualization 500a to render visualization 500b. An expanded view of dimension 510 is thereby rendered. In particular, an expanded data display 510c is rendered for data point 510a to reveal the current value of data point 510a.

Figure 6:
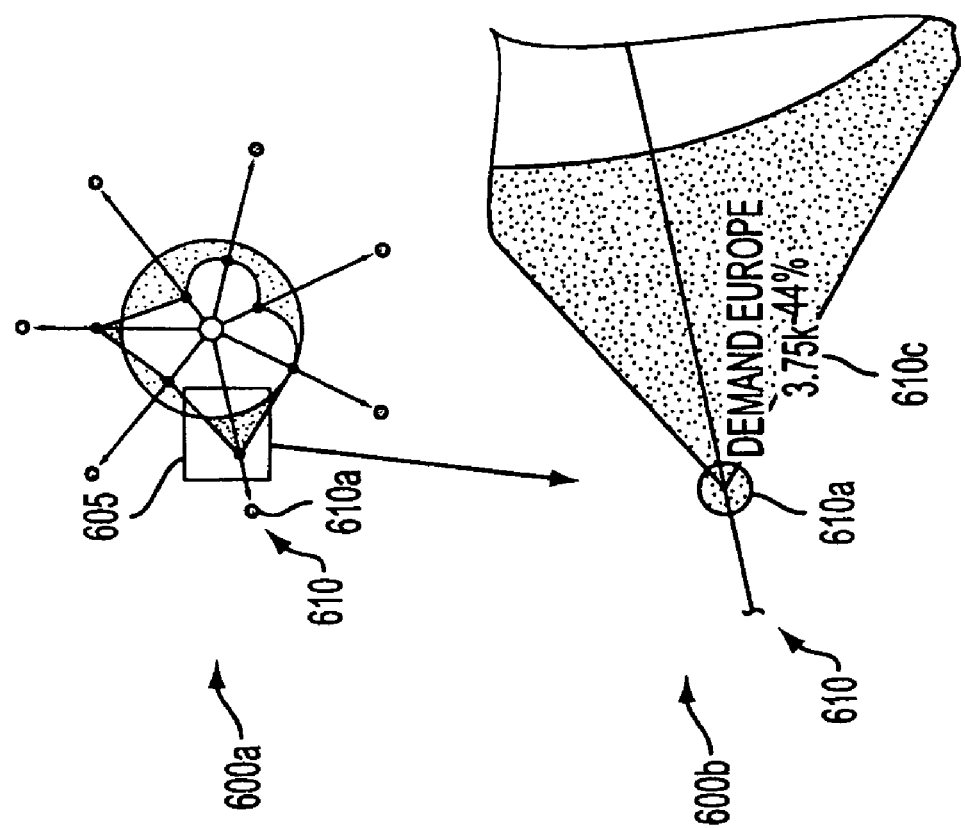
FIG. 6 is a screen shot illustrating another visualization and zoom feature in a smart radar chart GUI.

FIG. 6 shows another overview of the process of zooming in on a selected area of a visualization 600a having a first level of detail in order to see a portion of the visualization 600b in an expanded level of detail. The user, while viewing visualization 600a, manipulates a mouse, and upon clicking at a point within area 605 an expanded view 600b is rendered. The expanded view 600b displays a second-level of detail along dimension 610. In particular, the current value of the data for data point 610a may be observed at the expanded data display 610c.

Figure 7:
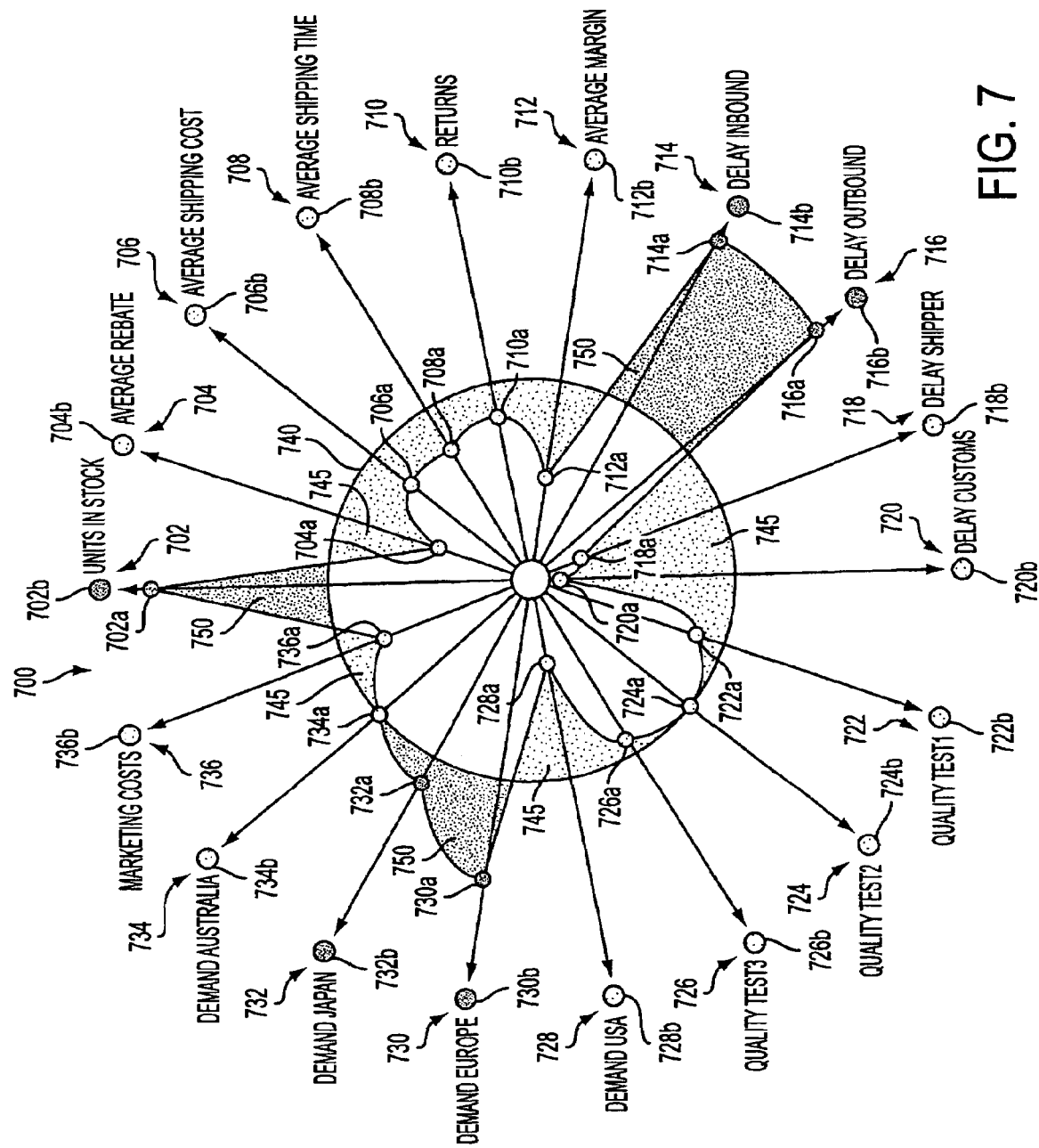
FIG. 7 is a screen shot illustrating another implementation of a visualization in a smart radar chart GUI.

Another exemplary XML structure is shown in Table 2. FIG. 7 illustrates a smart radar chart visualization 700 rendered using the data in Table 2.

TABLE 2

```
<?xml version="1.0" ?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="800" unit="" unitPos="right"
minValue="200" averageValue="300" maxValue="600" valueWeight="1200" />
    <dimension caption="Average rebate" value="9.12" unit="$" unitPos="left"
minValue="0" averageValue="21.35" maxValue="35" valueWeight="1200" />
    <dimension caption="Average shipping cost" value="5.75" unit="$" unitPos="left"
minValue="3" averageValue="6.75" maxValue="12.00" valueWeight="1200" />
    <dimension caption="Average shipping time" value="4.2" unit=" days"
unitPos="right" minValue="2" averageValue="5" maxValue="10" valueWeight="1200" />
    <dimension caption="Returns" value="500" unit="" unitPos="left" minValue="0"
averageValue="500" maxValue="400" valueWeight="1200" />
    <dimension caption="Average Margin" value="6.12" moreIsBetter="true" unit="$"
unitPos="left" minValue="-5" averageValue="2.21" maxValue="7.34" valueWeight="1200"
/>
    <dimension caption="Delay Inbound" value="600" unit="" unitPos="right"
minValue="200" averageValue="300" maxValue="600" valueWeight="1200" />
    <dimension caption="Delay Outbound" value="34.12" unit="$" unitPos="left"
minValue="0" averageValue="21.35" maxValue="35" valueWeight="1200" />
    <dimension caption="Delay Shipper" value="3.75" unit="$" unitPos="left"
minValue="3" averageValue="6.75" maxValue="12.00" valueWeight="1200" />
    <dimension caption="Delay Customs" value="2.2" unit=" days" unitPos="right"
minValue="2" averageValue="5" maxValue="10" valueWeight="1200" />
    <dimension caption="Quality Test1" value="78" moreIsBetter="true" unit="%"
unitPos="right" minValue="0" averageValue="67" maxValue="100" valueWeight="1200"
/>
    <dimension caption="Quality Test2" value="88" moreIsBetter="true" unit="%"
unitPos="right" minValue="0" averageValue="87" maxValue="100" valueWeight="1200"
/>
    <dimension caption="Quality Test3" value="100" moreIsBetter="true" unit="%"
unitPos="right" minValue="0" averageValue="92" maxValue="100" valueWeight="1200"
/>
    <dimension caption="Demand USA" value="36" moreIsBetter="true" unit="k"
unitPos="right" minValue="0" averageValue="21.35" maxValue="35" valueWeight="1200"
/>
    <dimension caption="Demand Europe" value="3.75" moreIsBetter="true" unit="k"
unitPos="right" minValue="3" averageValue="6.75" maxValue="12.00"
value Weight="1200" />
    <dimension caption="Demand Japan" value="4.2" moreIsBetter="true" unit="k"
unitPos="right" minValue="2" averageValue="5" maxValue="10" valueWeight="1200" />
    <dimension caption="Demand Australia" value="300" moreIsBetter="true" unit=""
unitPos="right" minValue="0" averageValue="300" maxValue="400" valueWeight="1200"
/>
    <dimension caption="Marketing costs" value="650" unit="$k" unitPos="left"
minValue="320" averageValue="750" maxValue="1500" valueWeight="1200" />
</SmartRadarChart>
```

FIG. 7 is similar to FIG. 1 in that the same number of dimensions of data are shown. However, the values for some of the data points shown in FIG. 7 differ from those shown in FIG. 1. In particular, FIG. 7 shows eighteen dimensions of data 702, 704, 706, 708, 710, 712, 714, 716, 718, 720, 722, 724, 726, 728, 730, 732, 734, and 736. Each dimension has an associated data point. Data points 702a, 704a, 706a, 708a, 710a, 712a, 714a, 716a, 718a, 720a, 722a, 724a, 726a, 728a, 730a, 732a, 734a, and 736a are normalized and plotted as shown in accordance with their values in Table 2. Summary indicators 702b, 704b, 706b, 708b, 710b, 712b, 714b, 716b, 718b, 720b, 722b, 724b, 726b, 728b, 730b, 732b, 734b, and 736b each indicates, e.g., by using a color, shading, or other change in appearance, whether or not the data points corresponding to each of the summary indicators is greater than, less than, and/or equal to the average value as shown in relation to the 50% circle 740. For example, for dimension 702 ("Units in stock"), the data point 702a is worse than average, as indicated by the shaded area 750, which is colored red in this example, plotted outside the 50% normal circle 740. The summary indicator 702b is correspondingly as shown as red in this example. Similarly, with respect to dimension 704 (Average rebate), the data point 704a is better than average, as indicated by shaded area 745, which is colored green in this example, and is plotted insider the 50% circle 740. In this example, the summary indicator 704b is correspondingly as shown as green.

Figure 8:
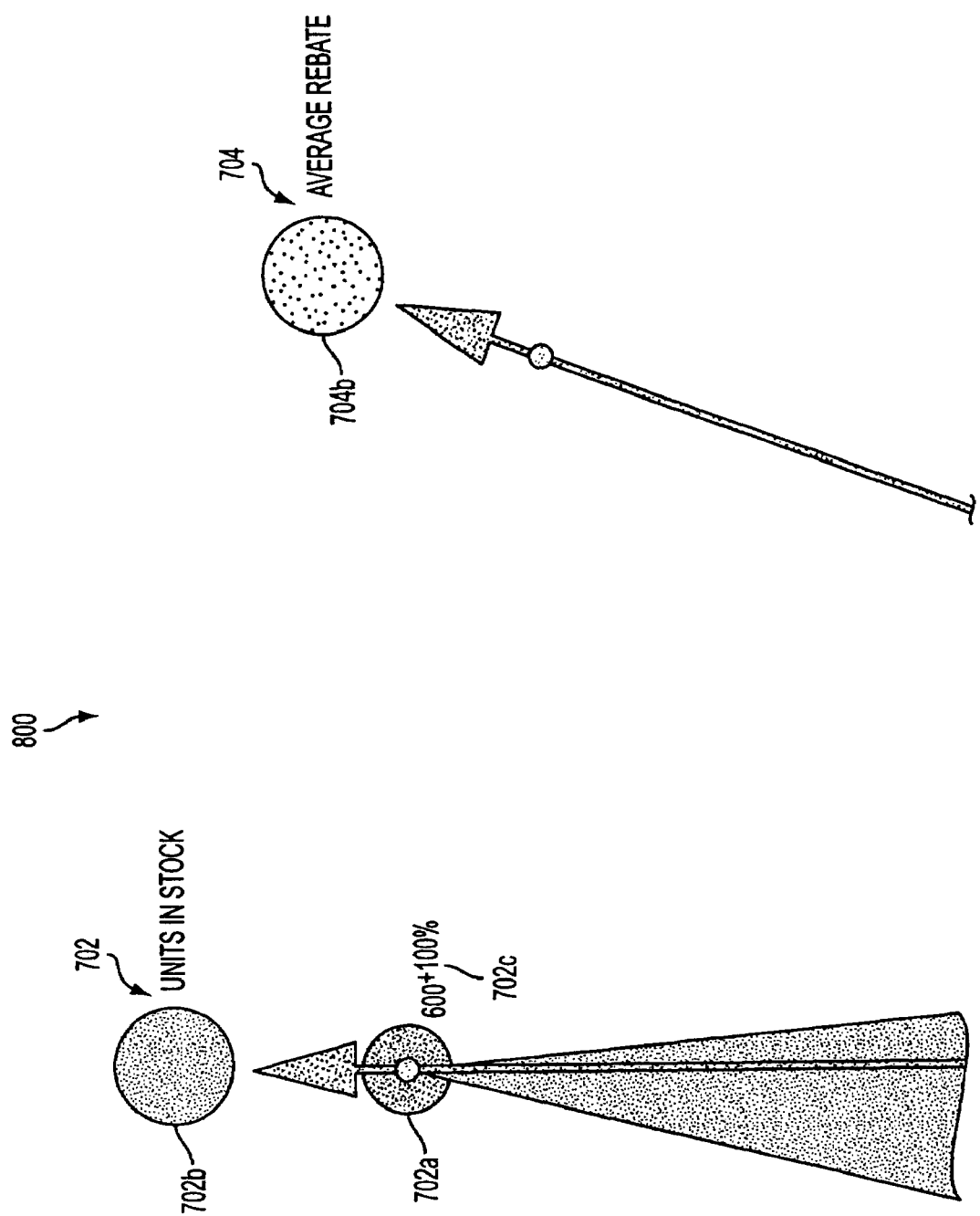
FIG. 8 is a screen shot illustrating an enlarged and expanded view of a portion of the visualization of FIG. 7.

FIG. 8 is an illustration of an enlarged and expanded view 800 of a selected portion of the visualization 700 of FIG. 7. In particular, the expanded view 800 shows a second, increased level of detail for the dimensions 702 and 704. The detailed data display 702c reveals an expanded level of detail concerning data point 702a. Summary indicator 702b is color coded to show that the data point 702a is a negative exception.

Figure 9:
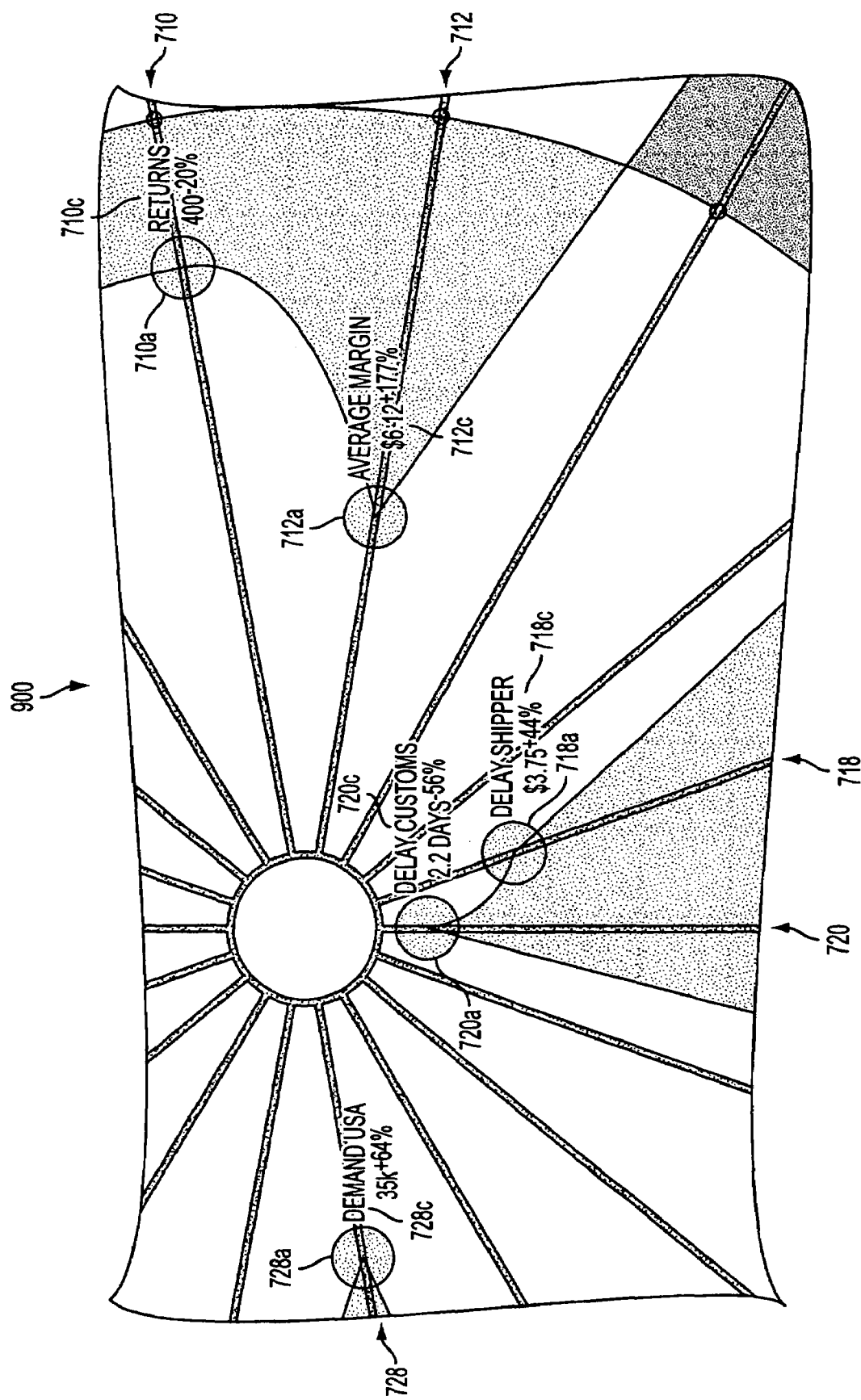
FIG. 9 is a screen shot illustrating an enlarged and expanded view of a portion of the visualization of FIG. 7.

FIG. 9 is another illustration of an enlarged and expanded view 900 of a different selected portion of the visualization 700 of FIG. 7. In particular, an expanded view is shown for dimensions 710, 712, 718, 720, and 728. Expanded data display 710c is shown for data points 710a, expanded data display 712c is shown for data point 712a, expanded data display 718c is shown for data point 718a, expanded data display 720c is shown for data point 720a, expanded data display 728c is shown for data point 728a. A user is able to shift views from the expanded view 800 to the expanded view 900 by dragging a mouse (e.g., by activating a mouse button and moving the mouse) or otherwise manipulating an input control.

More specifically, the expanded data display 712c in FIG. 9 shows that the average margin is presently $6.12, which is 177% above the average value of the average margin. Also, expanded data display 720c shows that the value of the delay in customs is 2.2 days, which is 56% below the average value of the delay in customs. And, the expanded data display 718c shows that the delay by the shipper is $3.75, which is 44% below the average value of the delay by the shipper. A user reviewing FIG. 9 can quickly identify that these KPIs are better than the normal value because of the presentation techniques of visualization 900.

Figure 10:
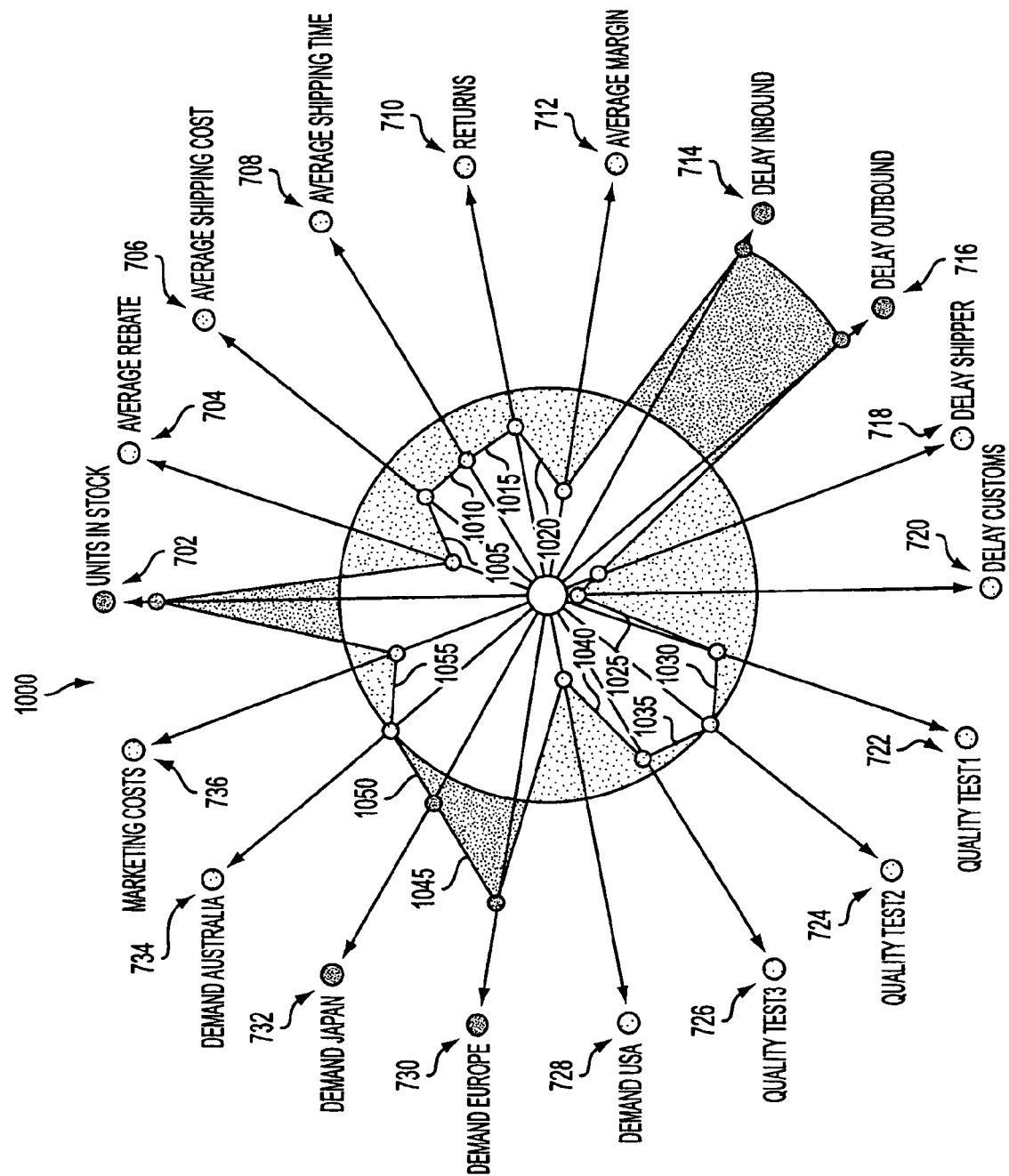
FIG. 10 is a screen shot illustrating another implementation of a visualization in a smart radar chart GUI.

Another exemplary XML structure is shown in Table 3. FIG. 10 illustrates a smart radar chart visualization 1000 rendered using the data in Table 3.

TABLE 3

```
<?xml version="1.0" ?>
<SmartRadarChart sURL="SmartRadarChart.xml" sClickZoom="-230" sAlertSound="true"
sRefreshPeriod="1000" sCurvedView="false" sAreaAlpha="70" >
    <dimension caption="Units in stock" value="800" unit="" unitPos="right"
minValue="200" averageValue="300" maxValue="600" valueWeight="1200" />
    <dimension caption="Average rebate" value="9.12" unit="$" unitPos="left"
minValue="0" averageValue="21.35" maxValue="35" valueWeight="1200" />
    <dimension caption="Average shipping cost" value="5.75" unit="$" unitPos="left"
minValue="3" averageValue="6.75" maxValue="12.00" valueWeight="1200" />
    <dimension caption="Average shipping time" value="4.2" unit=" days"
unitPos="right" minValue="2" averageValue="5" maxValue="10" valueWeight="1200" />
    <dimension caption="Returns" value="500" unit="" unitPos="left" minValue="0"
averageValue="500" maxValue="400" valueWeight="1200" />
    <dimension caption="Average Margin" value="6.12" moreIsBetter="true" unit="$"
unitPos="left" minValue="-5" averageValue="2.21" maxValue="7.34" valueWeight="1200"
/>
    <dimension caption="Delay Inbound" value="600" unit="" unitPos="right"
minValue="200" averageValue="300" maxValue="600" valueWeight="1200" />
    <dimension caption="Delay Outbound" value="34.12" unit="$" unitPos="left"
minValue="0" averageValue="21.35" maxValue="35" valueWeight="1200" />
    <dimension caption="Delay Shipper" value="3.75" unit="$" unitPos="left"
minValue="3" averageValue="6.75" maxValue="12.00" valueWeight="1200" />
    <dimension caption="Delay Customs" value="2.2" unit=" days" unitPos="right"
minValue="2" averageValue="5" maxValue="10" valueWeight="1200" />
    <dimension caption="Quality Test1" value="78" moreIsBetter="true" unit="%"
unitPos="right" minValue="0" averageValue="67" maxValue="100" valueWeight="1200"
/>
    <dimension caption="Quality Test2" value="88" moreIsBetter="true" unit="%"
unitPos="right" minValue="0" averageValue="87" maxValue="100" valueWeight="1200"
/>
    <dimension caption="Quality Test3" value="100" moreIsBetter="true" unit="%"
unitPos="right" minValue="0" averageValue="92" maxValue="100" valueWeight="1200"
/>
    <dimension caption="Demand USA" value="36" moreIsBetter="true" unit="k"
unitPos="right" minValue="0" averageValue="21.35" maxValue="35" valueWeight="1200"
/>
    <dimension caption="Demand Europe" value="3.75" moreIsBetter="true" unit="k"
unitPos="right" minValue="3" averageValue="6.75" maxValue="12.00"
valueWeight="1200"/>
    <dimension caption="Demand Japan" value="4.2" moreIsBetter="true" unit="k"
```

TABLE 3-continued unitPos="right" minValue="2" averageValue="5" maxValue="10" valueWeight="1200" />
    <dimension caption="Demand Australia" value="300" moreIsBetter="true" unit=""
unitPos="right" minValue="0" averageValue="300" maxValue="400" valueWeight="1200"
/>
    <dimension caption="Marketing costs" value="650" unit="$k" unitPos="left"
minValue="320" averageValue="750" maxValue="1500" valueWeight="1200" />
</SmartRadarChart>

FIG. 10 illustrates a non-curved visualization 1000 of the visualization 700 of FIG. 7, which uses curved lines. The data plotted in visualization 1000 corresponds to the data in Table 3. The data in Table 3 is identical to the data in Table 2 except that the "sCurveView" attribute is set to false. By contrast, in Table 2, the "sCurveView" attribute is set to true. As can be seen in FIG. 10, the visualization 1000 appears slightly different than the visualization 700 because the shaded areas between the dimensions are straight lines rather than curved lines. For example, the area 1005 between dimensions 704 and 706 is straight and not curved. Similarly, area 1010 between dimensions 706 and 708 is straight, as is area 1015 between dimensions 708 and 710, area 1020 between dimensions 710 and 712, area 1025 between dimensions 720 and 722, area 1030 between dimensions 722 and 724, area 1035 between dimensions 724 and 726, area 1040 between dimensions 726 and 728, area 1045 between dimensions 730 and 732, area 1050 between dimensions 732 and 734, and area 1055 between dimensions 734 and 736.

Figure 11:
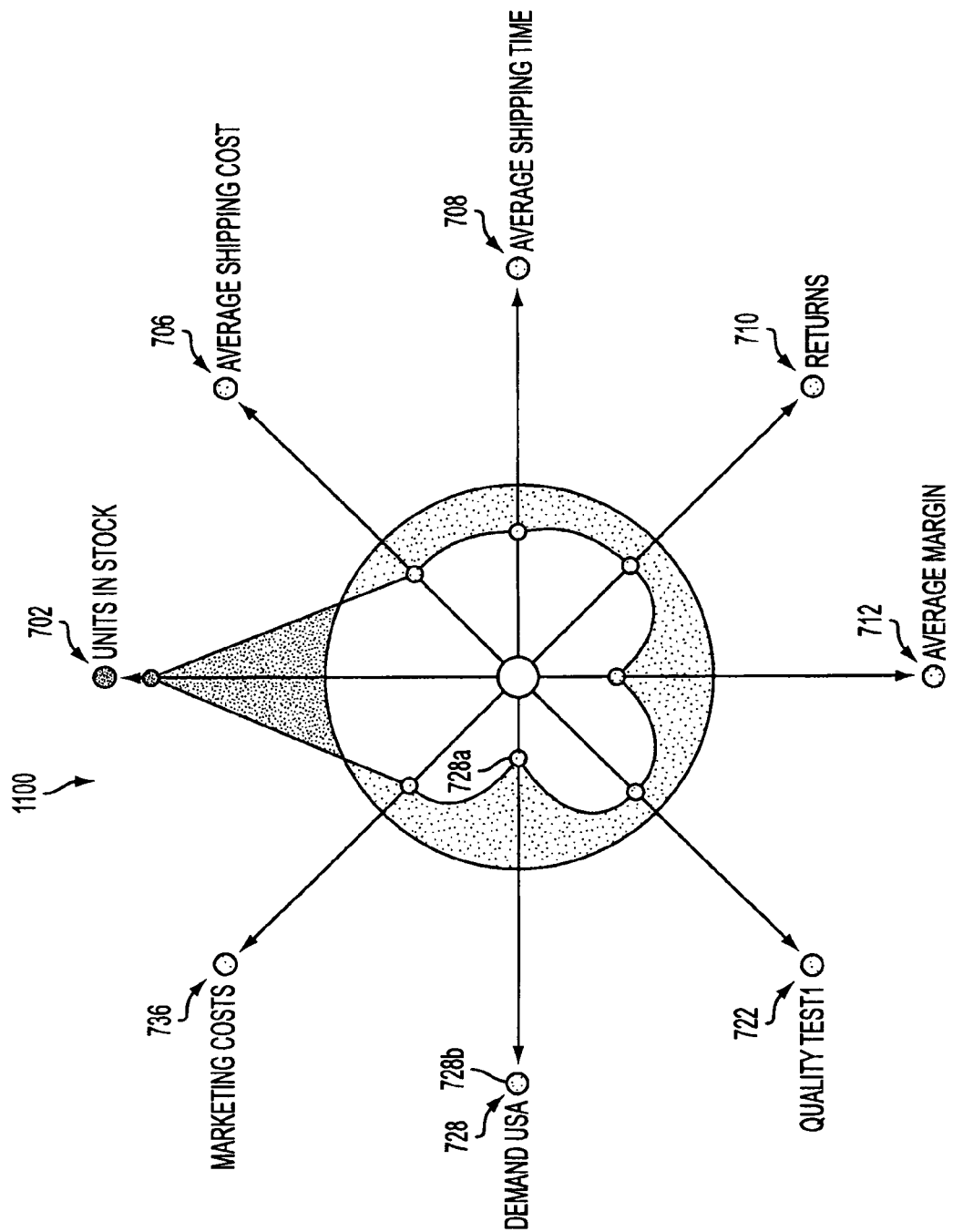
FIG. 11 is a screen shot illustrating another implementation of a visualization in a smart radar chart GUI.

Another exemplary XML structure is shown in Table 4. FIG. 11 illustrates a smart radar chart visualization 1100 rendered using the data in Table 4.

FIG. 11 is similar to FIG. 7, but, among other things, has fewer dimensions than FIG. 7. The data in Table 4 is similar to the data shown in Table 2, except that Table 4 has only eight dimensions. Ten of the dimensions shown in Table 2 have been removed in forming Table 4. In particular, FIG. 11 shows dimensions 702, 706, 708, 710, 712, 722, 728, and 736. In visualization 1100, the eight remaining dimensions have been redistributed evenly about the radar chart GUI, and are in a different position than that plotted with the visualization 700 having eighteen dimensions, as shown in FIG. 7.

Figure 12:
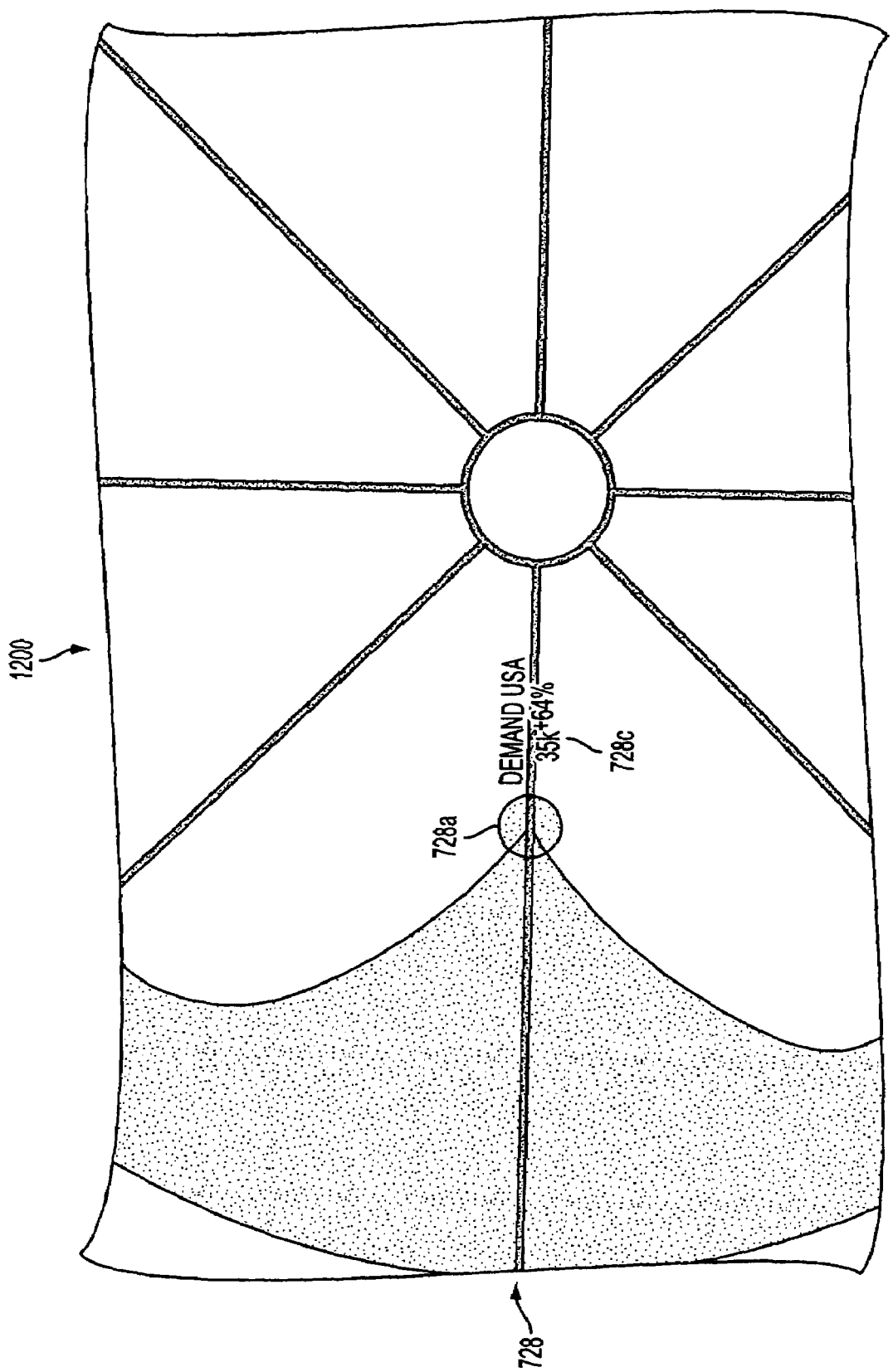
FIG. 12 is a screen shot illustrating an enlarged and expanded view of a portion of the visualization of FIG. 11.

FIG. 12 is an illustration of an enlarged and expanded view 1200 of a selected portion of the visualization 1100 in FIG. 11. In particular, the expanded visualization 1200 shows an expanded data display 728c corresponding to data point 728a along dimension 728. More specifically, FIG. 12 shows that demand in the USA is 35,000 (the maximum value for that data dimension) and is 64% above the average value of the demand in the USA. A user reviewing FIG. 12 can quickly identify that this KPI is above the normal value (i.e., better than the normal value) because of the presentation techniques of visualization 1100.

Figure 13:
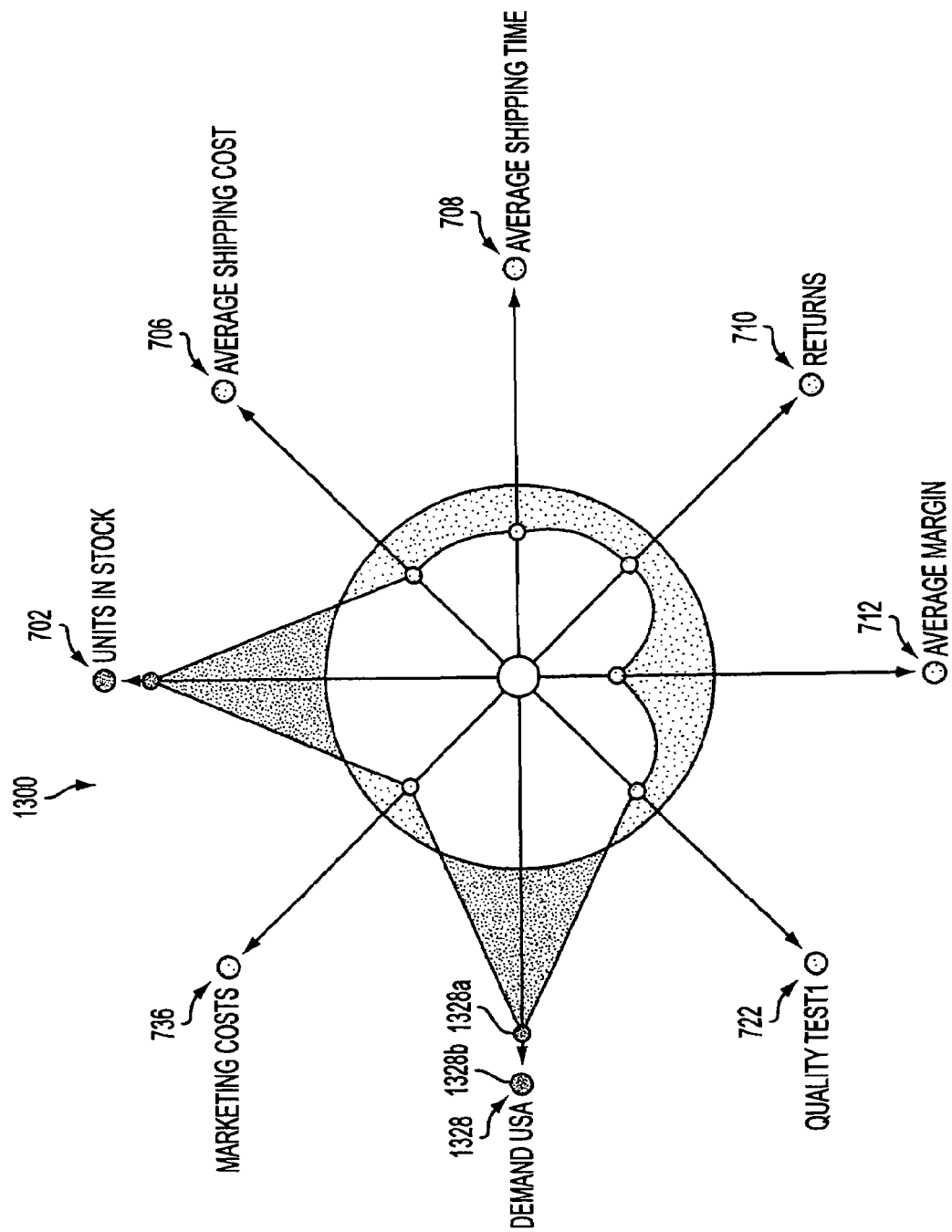
FIG. 13 is a screen shot illustrating another implementation of a visualization in a smart radar chart GUI.

Another exemplary XML structure is shown in Table 5. FIG. 13 illustrates a smart radar chart visualization 1300 rendered using the data in Table 5.

TABLE 4

<?xml version="1.0" ?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="800" unit="" unitPos="right"
minValue="200" averageValue="300" maxValue="600" valueWeight="1200" />
    <dimension caption="Average shipping cost" value="5.75" unit="$" unitPos="left"
minValue="3" averageValue="6.75" maxValue="12.00" valueWeight="1200" />
    <dimension caption="Average shipping time" value="4.2" unit=" days"
unitPos="right" minValue="2" averageValue="5" maxValue="10" valueWeight="1200" />
    <dimension caption="Returns" value="500" unit="" unitPos="left" minValue="0"
averageValue="500" maxValue="400" valueWeight="1200" />
    <dimension caption="Average Margin" value="6.12" moreIsBetter="true" unit="$"
unitPos="left" minValue="-5" averageValue="2.21" maxValue="7.34" valueWeight="1200"
/>
    <dimension caption="Quality Test1" value="78" moreIsBetter="true" unit="%"
unitPos="right" minValue="0" averageValue="67" maxValue="100" valueWeight="1200"
/>
    <dimension caption="Demand USA" value="36" moreIsBetter="true" unit="k"
unitPos="right" minValue="0" averageValue="21.35" maxValue="35" valueWeight="1200"
/>
    <dimension caption="Marketing costs" value="650" unit="$k" unitPos="left"
minValue="320" averageValue="750" maxValue="1500" valueWeight="1200" />
</SmartRadarChart>

TABLE 5

```
<?xml version="1.0" ?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="800" unit="" unitPos="right"
minValue="200" averageValue="300" maxValue="600" valueWeight="1200" />
    <dimension caption="Average shipping cost" value="5.75" unit="$" unitPos="left"
minValue="3" averageValue="6.75" maxValue="12.00" valueWeight="1200" />
    <dimension caption="Average shipping time" value="4.2" unit=" days"
unitPos="right" minValue="2" averageValue="5" maxValue="10" valueWeight="1200" />
    <dimension caption="Returns" value="500" unit="" unitPos="left" minValue="0"
averageValue="500" maxValue="400" valueWeight="1200" />
    <dimension caption="Average Margin" value="6.12" moreIsBetter="true" unit="$"
unitPos="left" minValue="-5" averageValue="2.21" maxValue="7.34" valueWeight="1200"
/>
    <dimension caption="Quality Test1" value="78" moreIsBetter="true" unit="%"
unitPos="right" minValue="0" averageValue="67" maxValue="100" valueWeight="1200"
/>
    <dimension caption="Demand USA" value="36" moreIsBetter="false" unit="k"
unitPos="right" minValue="0" averageValue="21.35" maxValue="35" valueWeight="1200"
/>
    <dimension caption="Marketing costs" value="650" unit="$k" unitPos="left"
minValue="320" averageValue="750" maxValue="1500" valueWeight="1200" />
</SmartRadarChart>
```

FIG. 13 is similar to FIG. 11 except that dimension 1328, which corresponds to dimension 728 in FIG. 11, is now shown as a negative exception rather than a positive exception. FIG. 13 corresponds to the data shown in Table 5, which is the same as the data in Table 4 except that the "moreIsBetter" attribute for the dimension "Demand USA" is set to false in Table 5 rather than set to true, as in Table 4. Thus, the negative/positive exception sense of the value flips, although the value itself remains the same. In other words, the "Demand USA" dimension 1328, 728 is now shown as a worse than average value in FIG. 13, whereas in FIG. 11 the "Demand USA" dimension was shown as a better than average value. Thus, in FIG. 13, the indicator 1328b shows a first shading, such as red, whereas in FIG. 11, indicator 728b shows a second shading, such as green.

Figure 14:
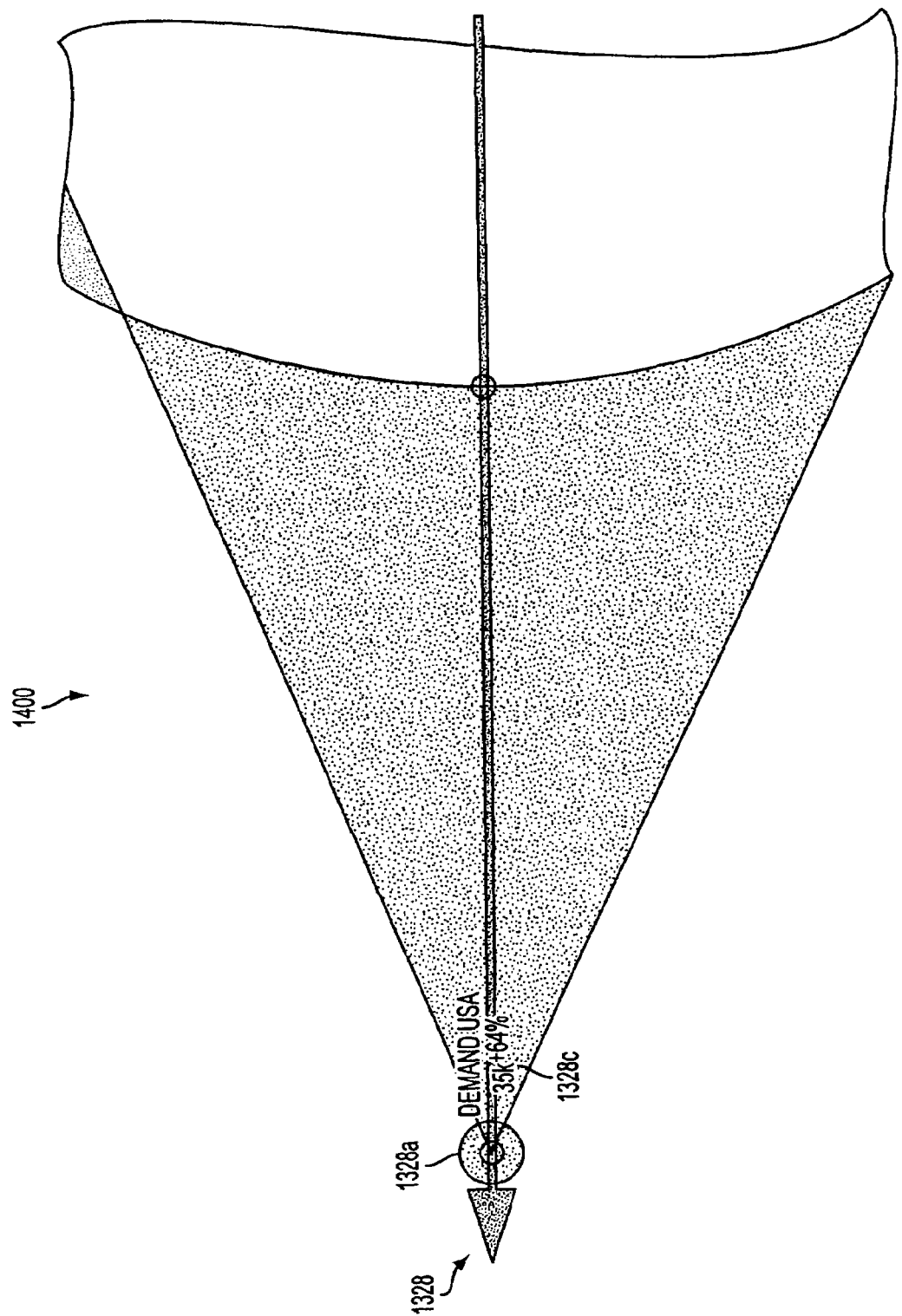
FIG. 14 is a screen shot illustrating an enlarged and expanded view of a portion of the visualization of FIG. 13.

FIG. 14 shows an enlarged and expanded view 1400 for a selected portion of the visualization 1300 of FIG. 13, revealing a second, expanded level of detail. In particular, the expanded data display 1328c is shown for data point 1328a along dimension 1328. Referring to FIGS. 12-14, the values of the data points 728a and 1328a, as shown in expanded data displays 728c and 1328c, are identical, however, due to the reversal of the "moreIsBetter" field, the data point 1328a is shown as being worse than average whereas data point 728a is shown as being better than average. Thus, a negative exception may be viewed as a positive exception and vice versa depending on the preferences of the user.

Figure 15:
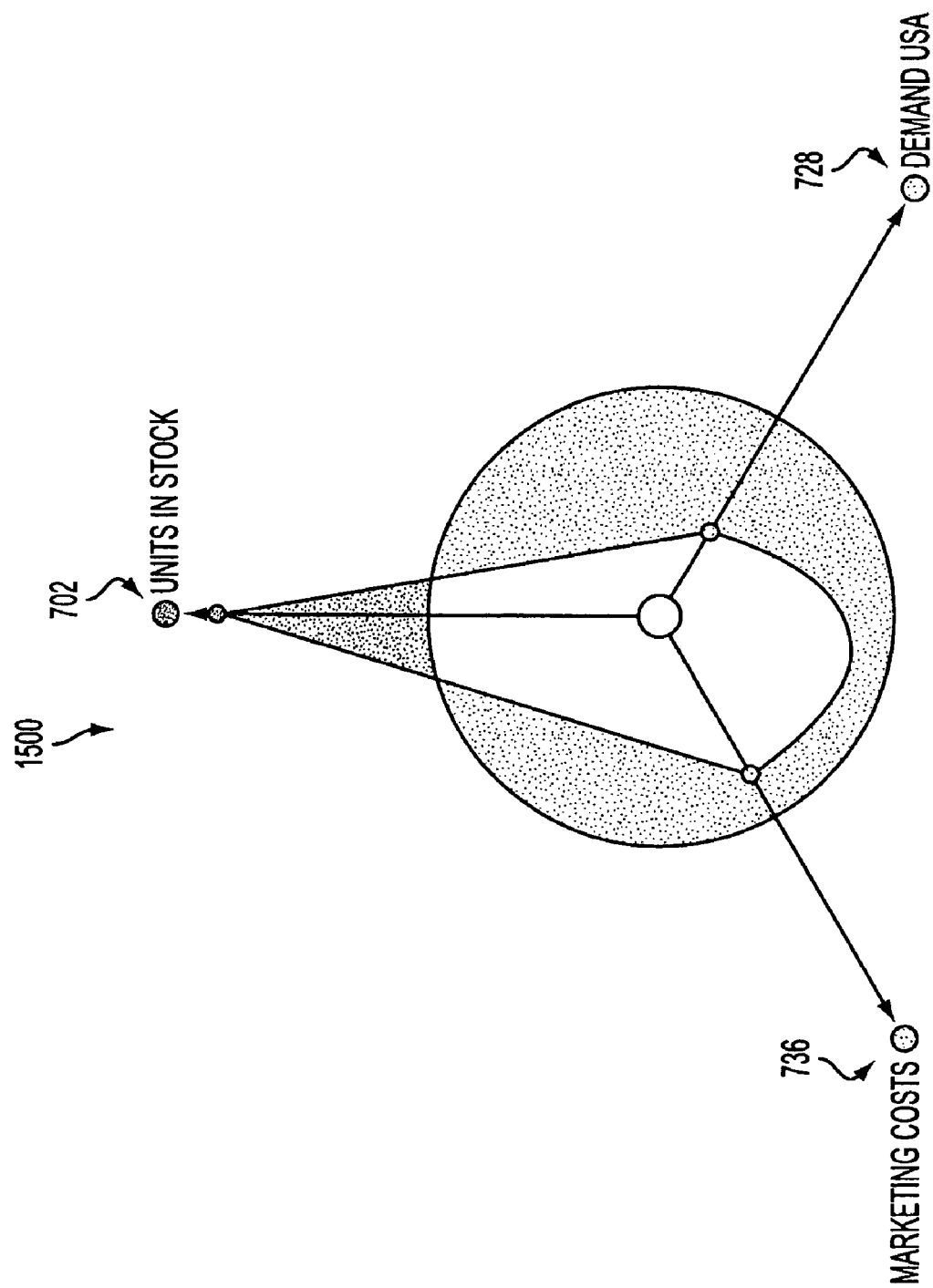
FIG. 15 is a screen shot illustrating another implementation of a visualization in a smart radar chart.

Another exemplary XML structure is shown in Table 6. FIG. 15 illustrates a smart radar chart visualization 1500 rendered using the data in Table 6.

TABLE 6

```
<?xml version="1.0" ?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="800" unit="" unitPos="right"
minValue="200" averageValue="300" maxValue="600" valueWeight="1200" />
    <dimension caption="Demand USA" value="36" moreIsBetter="true" unit="k"
unitPos="right" minValue="0" averageValue="21.35" maxValue="35" valueWeight="1200"
/>
    <dimension caption="Marketing costs" value="650" unit="$k" unitPos="left"
minValue="320" averageValue="750" maxValue="1500" valueWeight="1200" />
</SmartRadarChart>
```

FIG. 15 is similar to FIG. 7, but only three dimensions are shown. The data in Table 6 is similar to the data shown in Table 2, except that Table 6 has only three dimensions. Fifteen of the dimensions shown in Table 2 have been removed in forming the data in Table 6. In particular, FIG. 15 shows dimensions 702, 728, and 736. In visualization 1500, the three remaining dimensions have been evenly redistributed about the radar chart GUI, and are shown in a different position than the position shown in visualization 700 having eighteen 1 dimensions. For example, in FIG. 7, the dimension demand USA 728 is shown at approximately 260 degrees clockwise from the dimension units in stock 702. By contrast, in FIG. 15, the dimension demand USA 728 is shown at approximately 120 degrees clockwise from the dimension units in stock 702.

Figure 16:
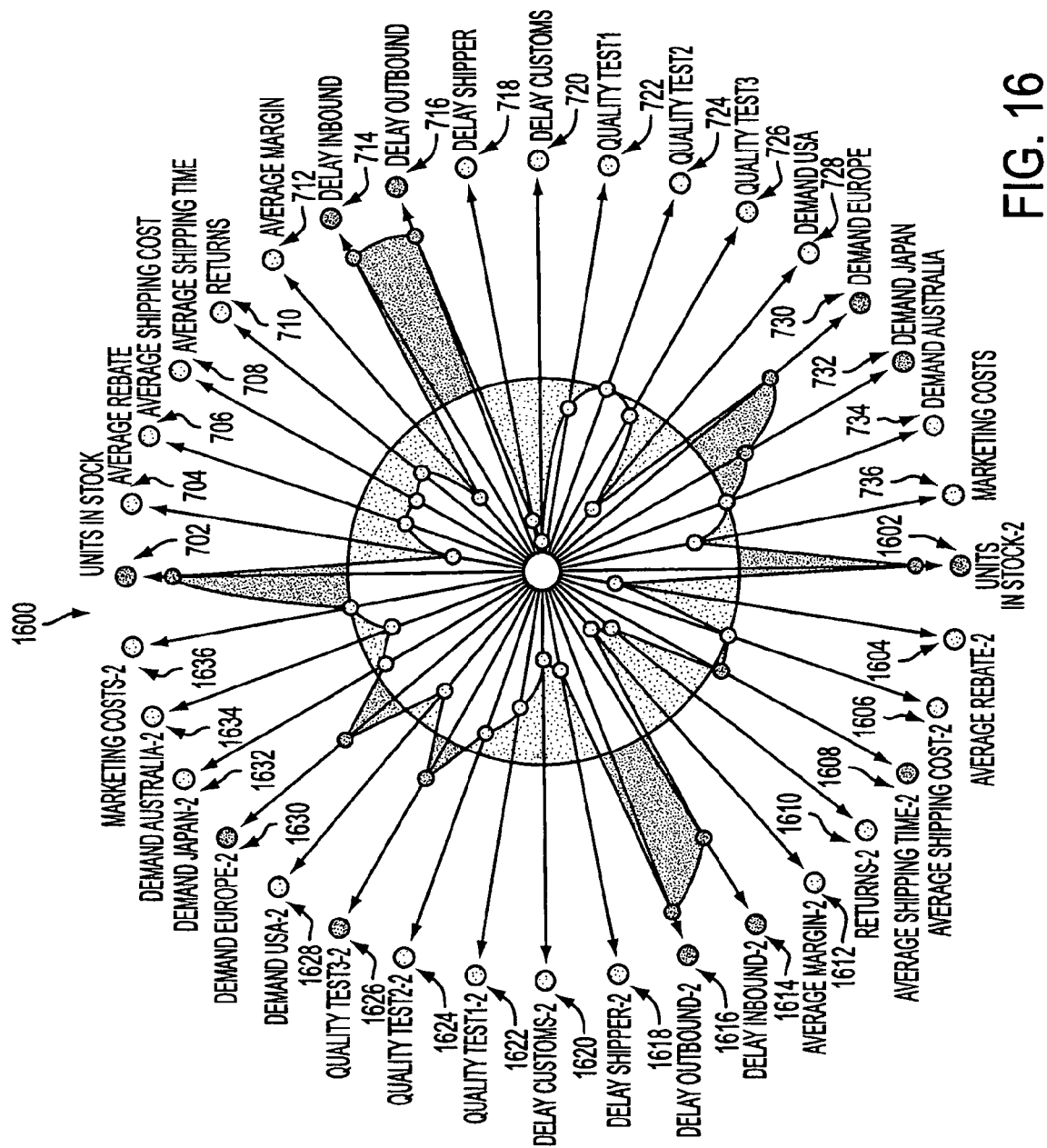
FIG. 16 is a screen shot illustrating another implementation of a visualization in a smart radar chart GUI.

Another exemplary XML structure is shown in Table 7. FIG. 16 illustrates a smart radar chart visualization 1600 rendered using the data in Table 7.

TABLE 7

```xml
<?xml version="1.0" ?>
<SmartRadarChart sURL="SmartRadarChart.xml" sClickZoom="-230" sAlertSound="true"
sRefreshPeriod="1000" sCurvedView="true" sAreaAlpha="70">
    <dimension caption="Units in stock" value="800" unit="" unitPos="right"
minValue="200" averageValue="300" maxValue="600" valueWeight="1200" />
    <dimension caption="Average rebate" value="9.12" unit="$" unitPos="left"
minValue="0" averageValue="21.35" maxValue="35" valueWeight="1200" />
    <dimension caption="Average shipping cost" value="5.75" unit="$" unitPos="left"
minValue="3" averageValue="6.75" maxValue="12.00" valueWeight="1200" />
    <dimension caption="Average shipping time" value="4.2" unit=" days"
unitPos="right" minValue="2" averageValue="5" maxValue="10" valueWeight="1200" />
    <dimension caption="Returns" value="500" unit="" unitPos="left" minValue="0"
averageValue="500" maxValue="400" valueWeight="1200" />
    <dimension caption="Average Margin" value="6.12" moreIsBetter="true" unit="$"
unitPos="left" minValue="-5" averageValue="2.21" maxValue="7.34" valueWeight="1200"
/>
    <dimension caption="Delay Inbound" value="600" unit="" unitPos="right"
minValue="200" averageValue="300" maxValue="600" valueWeight="1200" />
    <dimension caption="Delay Outbound" value="34.12" unit="$" unitPos="left"
minValue="0" averageValue="21.35" maxValue="35" valueWeight="1200" />
    <dimension caption="Delay Shipper" value="3.75" unit="$" unitPos="left"
minValue="3" averageValue="6.75" maxValue="12.00" valueWeight="1200" />
    <dimension caption="Delay Customs" value="2.2" unit=" days" unitPos="right"
minValue="2" averageValue="5" maxValue="10" valueWeight="1200" />
    <dimension caption="Quality Test1" value="78" moreIsBetter="true" unit="%"
unitPos="right" minValue="0" averageValue="67" maxValue="100" valueWeight="1200"
/>
    <dimension caption="Quality Test2" value="88" moreIsBetter="true" unit="%"
unitPos="right" minValue="0" averageValue="87" maxValue="100" valueWeight="1200"
/>
    <dimension caption="Quality Test3" value="100" moreIsBetter="true" unit="%"
unitPos="right" minValue="0" averageValue="92" maxValue="100" valueWeight="1200"
/>
    <dimension caption="Demand USA" value="36" moreIsBetter="true" unit="k"
unitPos="right" minValue="0" averageValue="21.35" maxValue="35" valueWeight="1200"
/>
    <dimension caption="Demand Europe" value="3.75" moreIsBetter="true" unit="k"
unitPos="right" minValue="3" averageValue="6.75" maxValue="12.00"
valueWeight="1200"/>
    <dimension caption="Demand Japan" value="4.2" moreIsBetter="true" unit="k"
unitPos="right" minValue="2" averageValue="5" maxValue="10" valueWeight="1200" />
    <dimension caption="Demand Australia" value="300" moreIsBetter="true" unit=""
unitPos="right" minValue="0" averageValue="300" maxValue="400" valueWeight="1200"
/>
    <dimension caption="Marketing costs" value="650" unit="$k" unitPos="left"
minValue="320" averageValue="750" maxValue="1500" valueWeight="1200" />
    <dimension caption="Units in stock-2" value="650" unit="" unitPos="right"
minValue="200" averageValue="300" maxValue="600" valueWeight="1200" />
    <dimension caption="Average rebate-2" value="6.52" unit="$" unitPos="left"
minValue="0" averageValue="21.35" maxValue="35" valueWeight="1200" />
    <dimension caption="Average shipping cost-2" value="6.75" unit="$" unitPos="left"
minValue="3" averageValue="6.75" maxValue="12.00" valueWeight="1200" />
    <dimension caption="Average shipping time-2" value="5.2" unit=" days"
unitPos="right" minValue="2" averageValue="5" maxValue="10" valueWeight="1200" />
    <dimension caption="Returns-2" value="200" unit="" unitPos="left" minValue="0"
averageValue="500" maxValue="400" valueWeight="1200" />
    <dimension caption="Average Margin-2" value="7.12" moreIsBetter="true" unit="$"
unitPos="left" minValue="-5" averageValue="2.21" maxValue="7.34" valueWeight="1200"
/>
    <dimension caption="Delay Inbound-2" value="500" unit="" unitPos="right"
minValue="200" averageValue="300" maxValue="600" valueWeight="1200" />
    <dimension caption="Delay Outbound-2" value="41.12" unit="$" unitPos="left"
minValue="0" averageValue="21.35" maxValue="35" valueWeight="1200" />
    <dimension caption="Delay Shipper-2" value="4.75" unit="$" unitPos="left"
minValue="3" averageValue="6.75" maxValue="12.00" valueWeight="1200" />
    <dimension caption="Delay Customs-2" value="3.2" unit=" days" unitPos="right"
minValue="2" averageValue="5" maxValue="10" valueWeight="1200" />
    <dimension caption="Quality Test1-2" value="88" moreIsBetter="true" unit="%"
unitPos="right" minValue="0" averageValue="67" maxValue="100" valueWeight="1200"
/>
    <dimension caption="Quality Test2-2" value="98" moreIsBetter="true" unit="%"
unitPos="right" minValue="0" averageValue="87" maxValue="100" valueWeight=" 1200"
/>
    <dimension caption="Quality Test3-2" value="90" moreIsBetter="true" unit="%"
unitPos="right" minValue="0" averageValue="92" maxValue="100" valueWeight="1200"
/>
    <dimension caption="Demand USA-2" value="26" moreIsBetter="true" unit="k"
unitPos="right" minValue="0" averageValue="21.35" maxValue="35" valueWeight="1200"
/>
```

TABLE 7-continued

```
    <dimension caption="Demand Europe-2" value="4.75" moreIsBetter="true" unit="k"
unitPos="right" minValue="3" averageValue="6.75" maxValue="12.00"
valueWeight="1200"/>
    <dimension caption="Demand Japan-2" value="5.2" moreIsBetter="true" unit="k"
unitPos="right" minValue="2" averageValue="5" maxValue="10" valueWeight="1200" />
    <dimension caption="Demand Australia-2" value="350" moreIsBetter="true" unit=""
unitPos="right" minValue="0" averageValue="300" maxValue="400" valueWeight="1200"
/>
    <dimension caption="Marketing costs-2" value="750" unit="$k" unitPos="left"
minValue="320" averageValue="750" maxValue="1500" valueWeight="1200" />
</SmartRadarChart>
```

FIG. 16 shows thirty six dimensions of data displayed on a visualization 1600 based on the data in Table 7. The data in Table 7 is similar to the data in Table 2, however eighteen additional dimensions of data are included. In particular, dimensions 702, 704, 706, 708, 710, 712, 714, 716, 718, 720, 722, 724, 726, 728, 730, 732, 734, 736, 1602, 1604, 1606, 1608, 1610, 1612, 1614, 1616, 1618, 1620, 1622, 1624, 1626, 1628, 1630, 1632, 1634, and 1636 are shown in visualization 1600. The thirty six dimensions of data have been distributed evenly about the smart radar chart GUI. Despite the number of dimensions of data shown in the smart radar chart GUI, negative and positive exceptions are still easily identified by the user.

Figure 17:
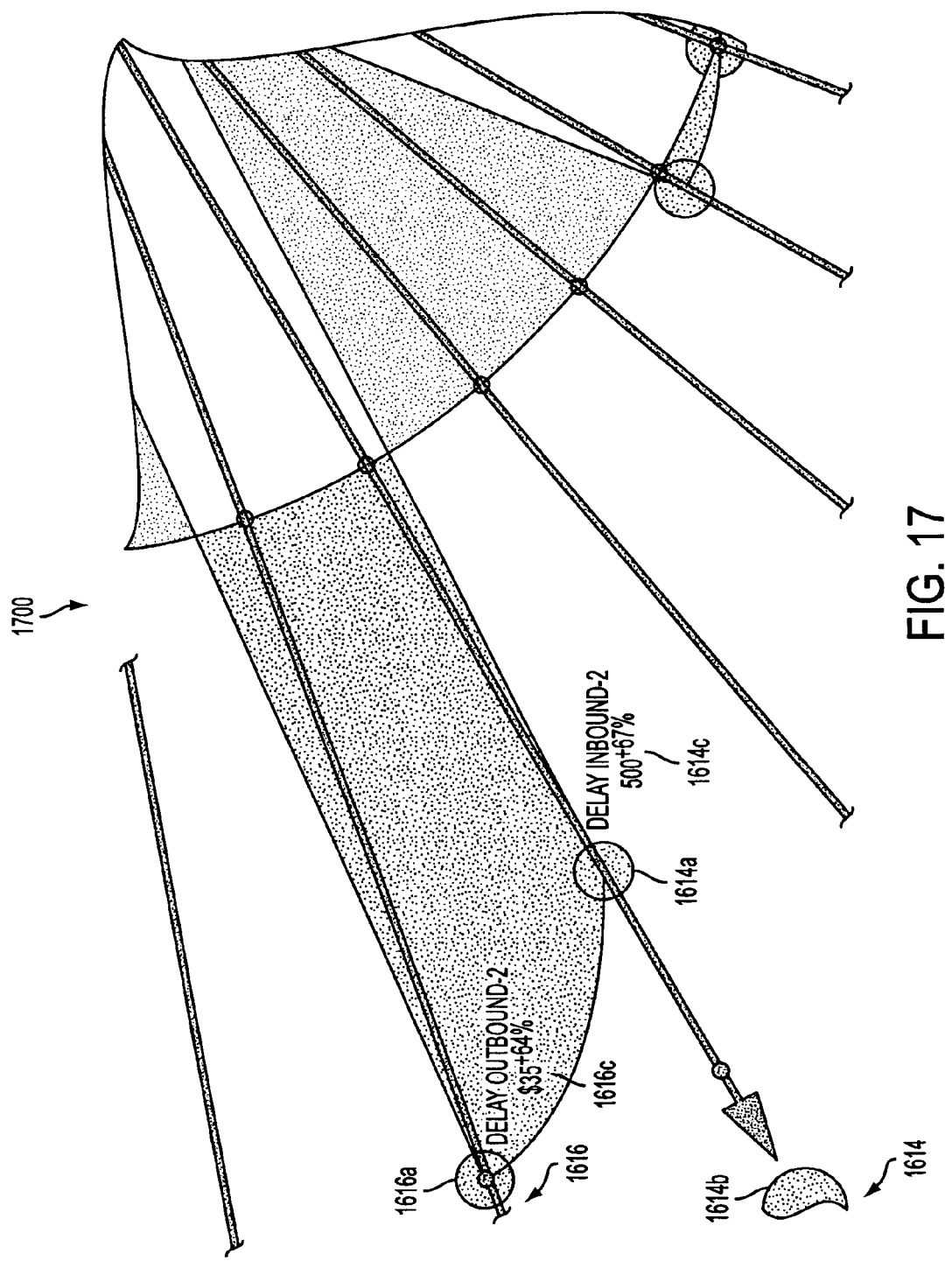
FIG. 17 is a screen shot illustrating an enlarged and expanded view of a portion of the visualization of FIG. 16.

FIG. 17 shows an illustration of an enlarged and expanded view 1700 of a selected portion of the visualization 1600 in FIG. 16. In particular, an expanded data display 1614c is shown for data point 1614a along dimension 1614. Also, a summary indicator 1614b is shown for dimension 1614. Similarly, an expanded data display 1616c is shown for data point 1616a along dimension 1616.

Figure 18:
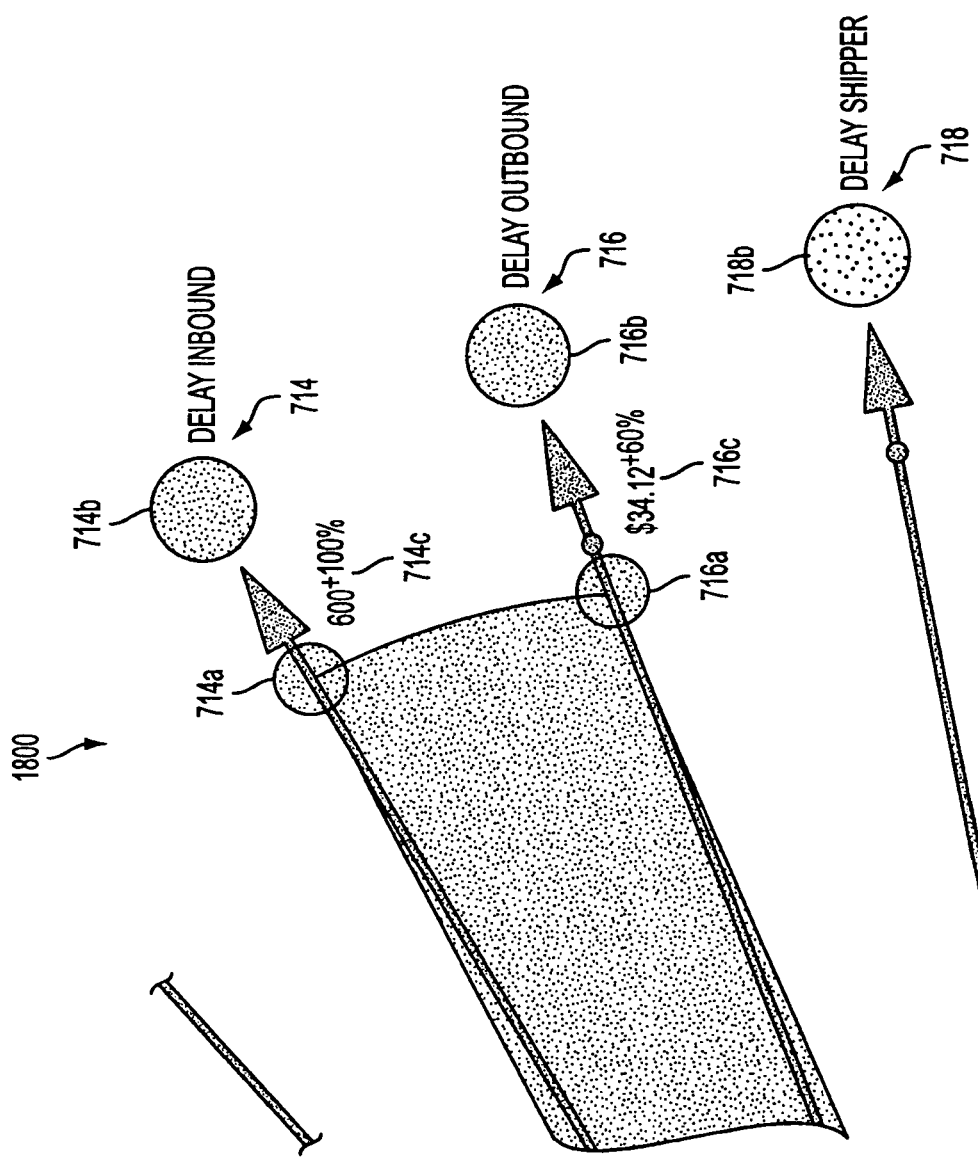
FIG. 18 is a screen shot illustrating an enlarged and expanded view of a portion of the visualization of FIG. 16.

FIG. 18 shows an illustration of an enlarged and expanded view 1800 of a different selected portion of the visualization 1600 in FIG. 16. In particular, an expanded data display 714c is shown for data point 714a. A summary indicator 714b is also shown for dimension 714. Similarly, an expanded data display 716c is shown for data point 716a, and summary indicator 716b is shown for dimension 716. Also, a summary indicator 718b is shown for dimension 718.

Figure 19:
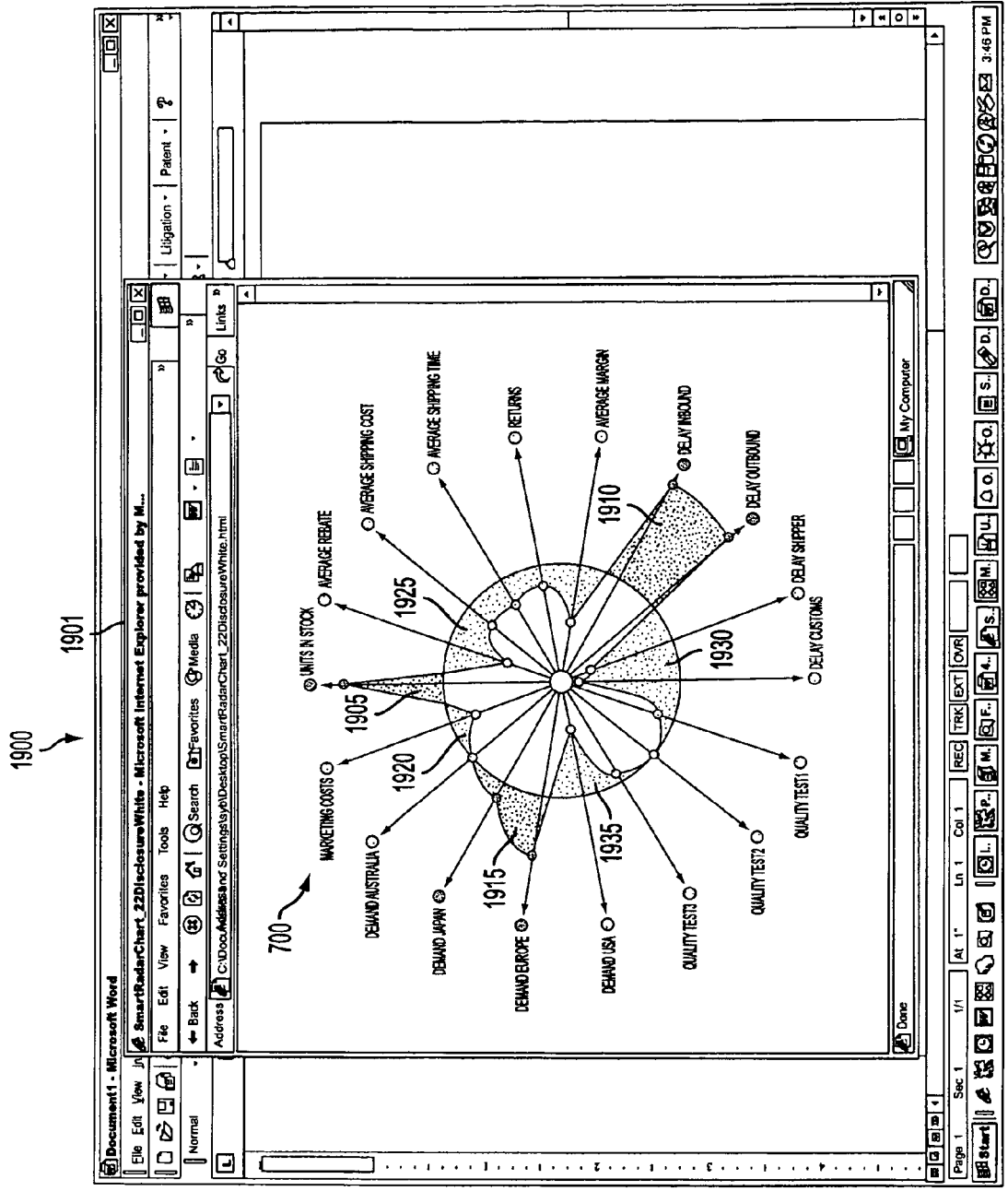
FIG. 19 is a screen shot illustrating a full size window containing the visualization of FIG. 7.

FIG. 19 shows a graphical user interface 1900 including a window 1901 having a smart radar chart GUI, which is shown as the smart radar chart visualization 700 of FIG. 7. Negative exception areas 1905, 1910, and 1915 and positive exception areas 1920, 1925, 1930, and 1935 are easily visible to the user, even with eighteen dimensions of data plotted in the visualization 700. The window 1901 is shown at a size such that the display area of the smart radar chart visualization 700 is maximized.

Figure 20:
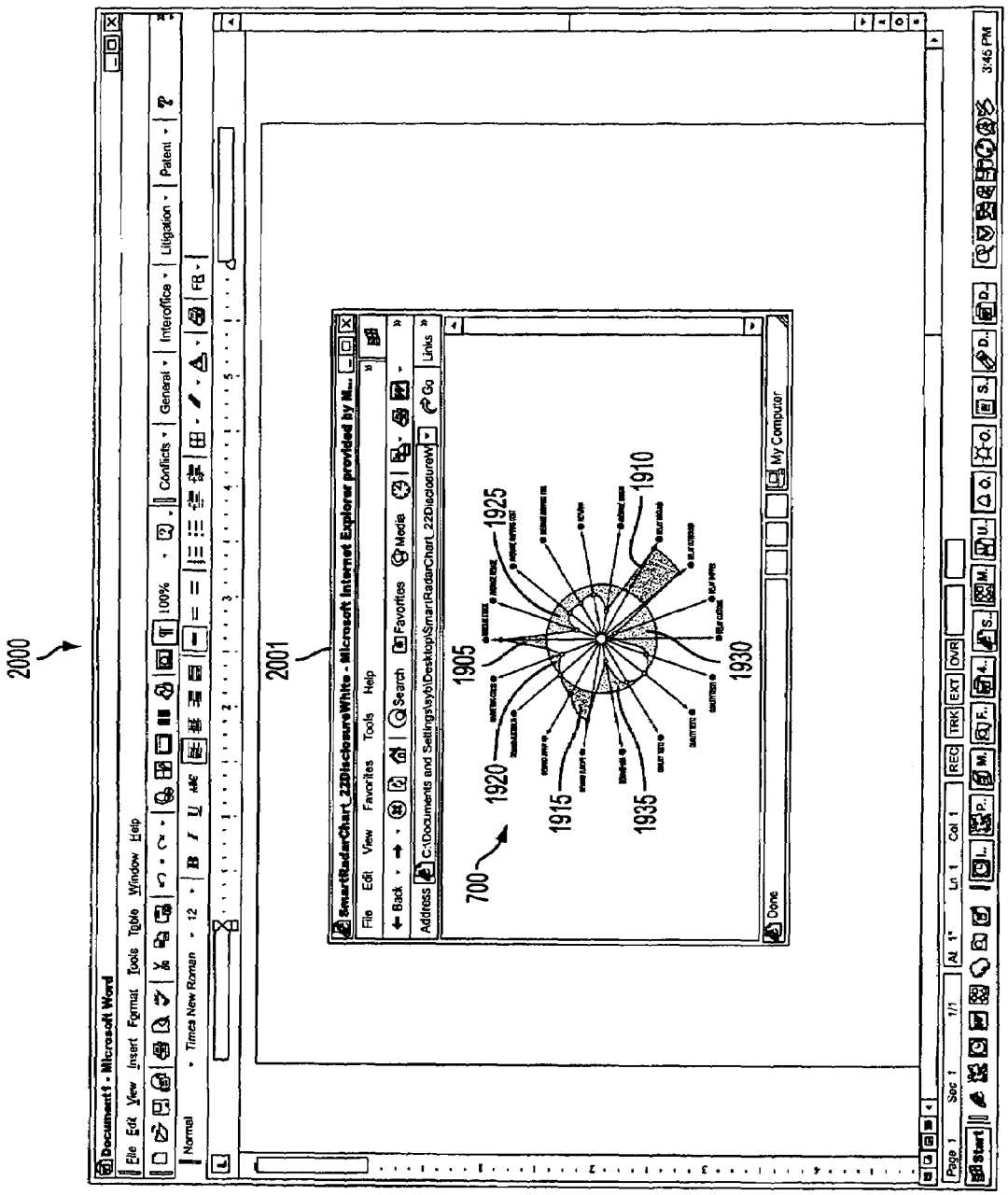
FIG. 20 is a screen shot illustrating a reduced size window containing the visualization of FIG. 7.

As shown in FIG. 20, the window 2001 is similar to window 1901 shown in FIG. 19, except that the window 2001 is reduced in size and the display area of the smart radar chart visualization 700 has also been reduced in size. However, the negative exception areas 1905, 1910, and 1915, and the positive exception areas 1920, 1925, 1930, and 1935 are still easily visible to the user, even though the display size of the visualization 700 in FIG. 20 is significantly smaller than shown in FIG. 19.

Figure 21:
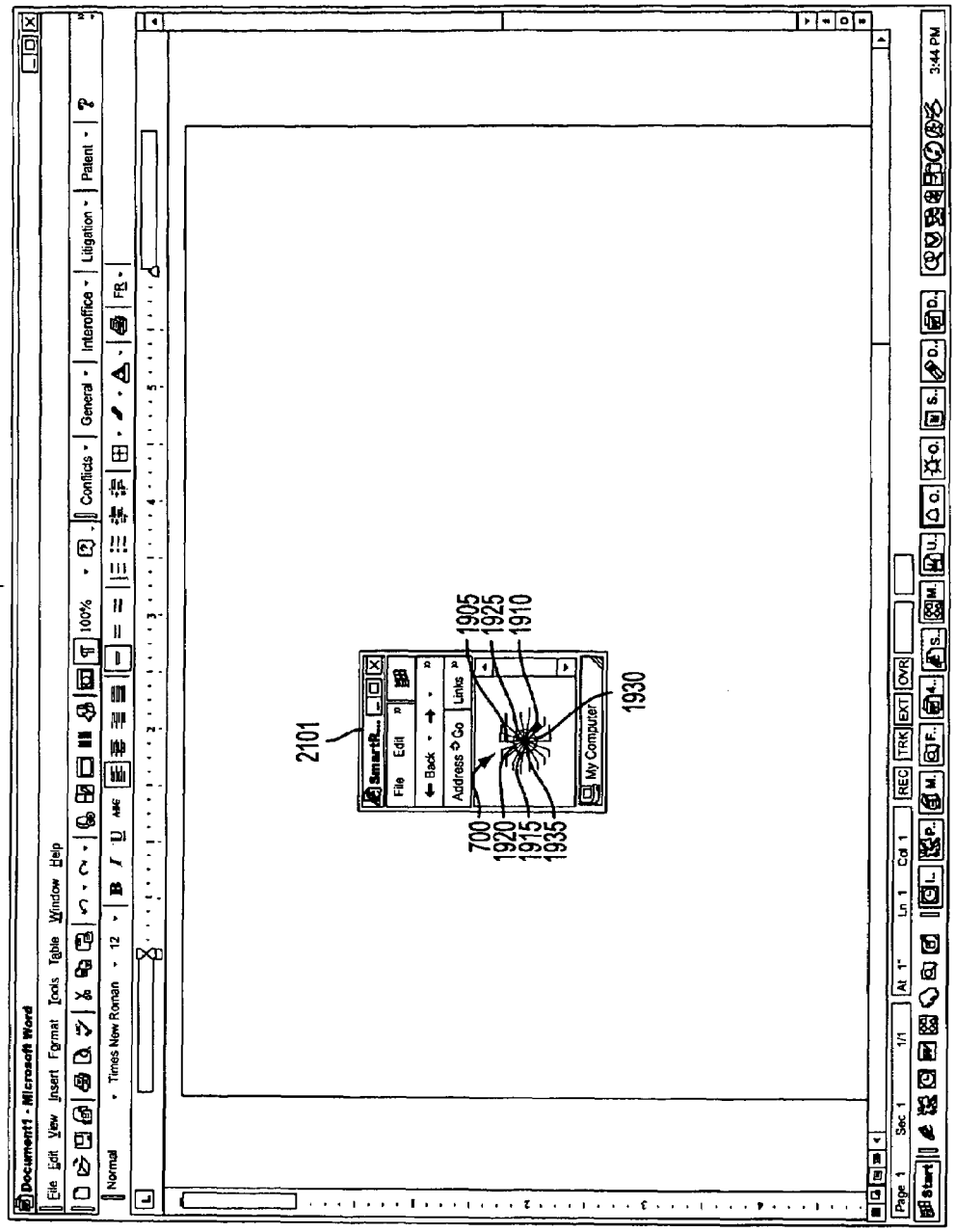
FIG. 21 is a screen shot illustrating a further reduced size window containing the visualization of FIG. 7.

As shown in FIG. 21, the window 2101 is similar to window 2001 shown in FIG. 20, except that the window 2101 is further reduced in size and the display area of the smart radar chart visualization 700 has also been further reduced in size. However, the negative exception areas 1905, 1910, and 1915, and the positive exception areas 1920, 1925, 1930, and 1935 are still visible to the user, even though the display size of the visualization 700 in FIG. 21 is significantly smaller than shown in FIG. 20.

Thus, the user may be alerted to the presence of exceptions in the data, and may zoom in on the exception areas to obtain further detail without the smart radar chart GUI having to occupy much screen real estate. Also, multiple visualizations may be shown while occupying a minimum of screen real estate, and yet the user is able to easily identify and investigate exceptions in the data shown.

FIG. 22 illustrates an exemplary block diagram 2200 of a system for generating a smart radar chart GUI for presentation to a user. The system 2200, includes a smart radar chart generator 2205 configured to receive data from a data source 2210 and to generate a smart radar chart GUI 2215 from the received data.

The smart radar chart generator 2205 typically is a software application running on a general purpose computer. In one implementation, the smart radar chart generator 2205 may reside on a client computer in a client/host architecture. For example, the smart radar chart generator 2205 may be a software application loaded on a client computer or a host computer for commanding and directing operations enabled by the client computer or the host computer. In another implementation, the smart radar chart generator 2205 may reside on a host computer.

Other examples of a smart radar chart generator 2205 include a program, a piece of code, an instruction, a device, a computer, a computer system, or a combination of these for independently or collectively instructing the client computer or the computer to interact and operate as described. The smart radar chart generator 2205 may be embodied permanently or temporarily in any type of machine, component, physical or virtual equipment, storage medium, or propagated signal capable of providing instructions to the client computer and the host computer.

A client computer or a host computer may include one or more general-purpose computers (e.g., personal computers), one or more special-purpose computers (e.g., devices specifically programmed to communicate with each other and/or the client system or the host system), or a combination of one or more general-purpose computers and one or more special-purpose computers. Other examples include a mobile device, including a mobile phone or a personal digital assistant (PDA), a workstation, a server, a device, a component, other physical or virtual equipment, or some combination of these capable of responding to and executing instructions. The client computer and the host computer may include devices that are capable of establishing peer-to-peer communications. The client computer and the host computer may be arranged to operate within or in concert with one or more other systems, such as, for example, one or more LANs ("Local Area Networks") and/or one or more WANs ("Wide Area Networks").

The client computer may communicate with the host computer over a communications link. A communications link typically includes a delivery network that provides direct or indirect communication between the client computer and the host computer, irrespective of physical separation. Examples of a delivery network include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data including, for example, a wired, wireless, cable or satellite communication pathway.

The smart radar chart generator 2205 receives data from a data source 2210. The data source 2210 may be, for example a database locally accessible to the smart radar chart generator 2205. For example, the data source 2210 may reside on a hard drive or other storage media accessible to a computer on which the smart radar chart generator 2205 is executing. In another implementation, the data source 2210 is located remote from the smart radar chart generator 2205, such as a server accessible via a communications link. The data from the data source 2210 may be communicated over a communications link to the smart radar chart generator 2205.

Data may be requested periodically from the data source 2210 by the smart radar chart generator 2205, data may requested continuously from the data source 2210, or data may be requested upon the occurrence of an event such as an input or request by a user. In one implementation of a data request and response, only data which has been changed is sent to the smart radar chart generator 2205 by the data source 2210. In another implementation, all data is sent to the smart radar chart generator 2205 by the data source 2210. When data is received, the smart radar chart generator 2205 typically regenerates the smart radar chart GUI automatically. However, other implementations are possible. For example, the smart radar chart generator 2205 may be configured to updated the smart radar chart GUI at periodic intervals irrespective of whether new data is present, or it may be configured to generate an update upon request by a user.

The smart radar chart generator 2205 is configured to generate a smart radar chart UI based upon the data received from the data source 2210. The smart radar chart generator 2205 may include controls for changing the appearance of the visualization to be generated. For example, controls may be provided to add, subtract, modify, or designate data dimensions for display. Also, controls may be provided to designate a minimum value, a maximum value, an average value, a label, a position for a data dimension. Other controls, such as controls for the appearance of an exception and controls otherwise affecting the appearance of the smart radar chart UI may be provided. The controls may be operable by a user, or the controls may be automatically executed by the smart radar chart generator 2205, for example, by accessing a file containing the desired settings.

The smart radar chart generator 2205 may also be configured to receive a user input through a user input device such as a mouse, and to generate a different view of the smart radar chart GUI 2215 based upon the user input. For example, a user input may be receive via a mouse, and the smart radar chart generator 2205 may generate an expanded view of the smart radar chart GUI based upon that input.

Examples of the smart radar chart GUI 2215 generated by the smart radar chart generator 2205 are described above with respect to FIGS. 1-21.

A number of implementations have been described. Nevertheless, it will be understood that various modifications may be made. Accordingly, other implementations are within the scope of the following claims.

What is claimed is:

1. A method comprising:
associating a data dimension with each of at least first through third key performance indicators;
displaying each data dimension as a line of radiating from a central point in a common plane;
computing, for each key performance indicator, a reference value;
associating, for each data dimension, the reference value of each key performance indicator with a designated point on each data dimension, each designated point being equidistant from the central point;
defining a circle around the central point intersecting each data dimension at the designated point, the circle identifying the reference value of each key performance indicator,
receiving data relating to each of the key performance indicators;
computing, for each key performance indicator, a value based upon the received data;
determining, for each key performance indicator, whether the value exhibits the reference value, a positive exception, or a negative exception;
displaying the data as first through third points on the data dimensions associated with the first through third key performance indicators, respectively, each of the first through third points being disposed on an outside of the circle if the data is determined to exhibit the negative exception, on the circle if the data is determined to exhibit the reference value, or on an inside of the circle if the data is determined to exhibit the positive exception;
defining a region bounded by the central point, the first point and the second point; and
highlighting a portion of the region outside of the circle with a first color, shade or texture, and a portion of the region inside of the circle with a second color, shade or texture.

2. The method of claim 1, wherein the lines displayed for each dimension are of substantially equal length.

3. The method of claim 1, wherein the reference value represents an average value, an expected value, or a desired value.

4. The method of claim 1, wherein the positive exception represents data having greater than the reference value, and wherein the negative exception represents data having less than the reference value.

5. The method of claim 1, wherein the positive exception represents data having less than the reference value, and wherein the negative exception represents data having greater than the reference value.

6. The method of claim 1, further comprising connecting the first point and the second point.

7. The method of claim 6, wherein the first point and the second point are connected with a line or a curve.

8. The method of claim 1, further comprising:
receiving a user selection indicative of the first performance indicator; and
rendering an expanded view of the first key performance indicator based upon the user selection.

9. The method of claim 8, wherein the user selection indicative of the one of the key performance indicators is a mouse-over event or an overt selection activity using a user input device.

10. The method of claim 8, further comprising closing the expanded view.

11. The method of claim 10, wherein closing the expanded view is based upon an expiration of a predetermined length of time, upon a position of a user input device, or a movement of the user input device.

12. The method of claim 1, wherein the lines displayed for each data dimension are evenly dispersed among the 360° around the central point.

13. The method of claim 1, wherein the lines displayed for each data dimension are not evenly dispersed among the 360° around the central point.

14. The method of claim 1, further comprising:
receiving a user selection indicative of a fourth key performance indicator; and
displaying the data dimension associated with the fourth key performance indicator as a line radiating from the central point.

15. The method of claim 14, further comprising:
redistributing the data dimensions associated with the at least first through fourth key performance indicators among the 360° around the central point.

16. The method of claim 1, further comprising:
receiving a user selection indicative of the first key performance indicator;
erasing the line displayed for the data dimension associated with the first key performance indicator.

17. The method of claim 16, further comprising:
redistributing the data dimensions associated with the at least second through third key performance indicators among the 360° around the central point.

18. The method of claim 1, wherein the data is received via the Internet.

19. The method of claim 1, wherein the data is continuously received.

20. The method of claim 1, wherein the data is received in response to a manual request by a user.

21. The method of claim 1, wherein the first color is green, and wherein the second color is red.

22. The method of claim 1, further comprising:
associating, for each key performance indicator, a caption; and
displaying the caption in association with the data dimension for each key performance indicator.

23. The method of claim 1, further comprising displaying the computed value in association with the data dimension for the each key performance indicator.

24. The method of claim 1, further comprising:
associating, for each key performance indicator, a unit attribute; and
displaying the unit attribute in association with the data dimension for each key performance indicator.

25. The method of claim 24, wherein displaying the unit attribute in association with the data dimension further comprises displaying the unit attribute left or right of the data dimension, based upon a unit position attribute.

26. The method of claim 1, further comprising associating, for each key performance indicator, a minimum value or a maximum value.

27. The method of claim 1, further comprises:
associating, for at least the first key performance indicator, a summary indicator;
displaying the summary indicator at an end of the data dimension associated with the first key performance indicator obverse to the central point; and
highlighting the summary indicator based upon whether the data is determined to exhibit a negative exception, a reference value, or a positive exception.

28. The method of claim 1, further comprising:
defining a second region bounded by the data dimension associated with the first key performance indicator, the circle, and a line connecting the first point with the second point; and
highlighting a portion of the second region inside the circle with a third color, shade or texture.

29. The method of claim 1, wherein defining the circle further comprises connecting the reference point for the data dimension corresponding to the first key performance indicator with the reference point for the data dimension corresponding to the second key performance indicator with a curved line segment.

30. A method comprising:
displaying, for each of a plurality of key performance indicators, linear data dimensions radiating from a central point in a common plane;
defining a circle around the central point intersecting each data dimension at a designated point associated with a reference value of each key performance indicator, the circle connecting adjacent designated points via curved line segments;
displaying the data as points on the data dimensions associated with the key performance indicators, each of the points being disposed on an outside of the circle if the data exhibits a negative exception, on the circle if the data exhibits a reference value, or on an inside of the circle if the data exhibits a positive exception;
defining a region bounded by the central point, the circle, at least one point, and/or a data dimension; and
highlighfing a portion of the region outside of the circle with a first characteristic, and a portion of the region inside of the circle with a second characteristic.

31. A device comprising:
a smart radar chart generator configured to:
associate a data dimension with each of at least first through third key performance indicators,
compute, for each key performance indicator, a reference value,
associate, for each data dimension, the reference value of each key performance indicator with a designated point on each data dimension, each designated point being equidistant from a central point in a common plane;
define a circle around the central point intersecting each data dimension at the designated point, the circle identifying the reference value of each key performance indicator,
receive data relating to each of the key performance indicators,
compute, for each key performance indicator, a value based upon the received data,
determine, for each key performance indicator, whether the value exhibits the reference value, a positive exception, or a negative exception,
define a region bounded by the central point, the first point and the second point; and
a graphical user interface configured to:
display each data dimension as a line of radiating from the central point in a common plane, display the data as first through third points on the data dimensions associated with the first through third key performance indicators, respectively, each of the first through third points being disposed on an outside of the circle if the data is determined to exhibit the negative exception, on the circle if the data is determined to exhibit the reference value, or on an inside of the circle if the data is determined to exhibit the positive exception, and highlight a portion of the region outside of the circle with a first color, shade or texture, and a portion of the region inside of the circle with a second color, shade or texture.

32. A computer program product tangibly embodied in a machine-readable storage medium, where the computer program product comprises instructions that, when read by a machine, operate to cause a data processing apparatus to:

associate a data dimension with each of at least first through third key performance indicators;

display each data dimension as a line of radiating from a central point in a common plane;

compute, for each key performance indicator, a reference value;

associate, for each data dimension, the reference value of each key performance indicator with a designated point on each data dimension, each designated point being equidistant from the central point;

define a circle around the central point intersecting each data dimension at the designated point, the circle identifying the reference value of each key performance indicator, receive data relating to each of the key performance indicators;

compute, for each key performance indicator, a value based upon the received data;

determine, for each key performance indicator, whether the value exhibits the reference value, a positive exception, or a negative exception;

display the data as first through third points on the data dimensions associated with the first through third key performance indicators, respectively, each of the first through third points being disposed on an outside of the circle if the data is determined to exhibit the negative exception, on the circle if the data is determined to exhibit the reference value, or on an inside of the circle if the data is determined to exhibit the positive exception;

define a region bounded by the central point, the first point and the second point; and highlight a portion of the region outside of the circle with a first color, shade or texture, and a portion of the region inside of the circle with a second color, shade or texture.

* * * * *